US012090799B2

(12) United States Patent
Duffy et al.

(10) Patent No.: US 12,090,799 B2
(45) Date of Patent: Sep. 17, 2024

(54) PERSISTENT ALARM TRANSMISSION ASSOCIATED WITH A VEHICLE MOUNTED WIRELESS SENSOR DEVICE

(71) Applicant: SENSATA TECHNOLOGIES, INC., Attleboro, MA (US)

(72) Inventors: Mark Duffy, Antrim (GB); Samuel D. Houston, Antrim (GB); Samuel K. Strahan, Ballymena (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 0 days.

(21) Appl. No.: 17/926,589

(22) PCT Filed: Jun. 17, 2020

(86) PCT No.: PCT/US2020/038151
§ 371 (c)(1),
(2) Date: Nov. 19, 2022

(87) PCT Pub. No.: WO2021/257067
PCT Pub. Date: Dec. 23, 2021

(65) Prior Publication Data
US 2023/0202246 A1 Jun. 29, 2023

(51) Int. Cl.
*B60C 23/04* (2006.01)

(52) U.S. Cl.
CPC ...... *B60C 23/0401* (2013.01); *B60C 23/0442* (2013.01); *B60C 23/0471* (2013.01); *B60C 23/0479* (2013.01)

(58) Field of Classification Search
CPC ........... B60C 23/0401; B60C 23/0442; B60C 23/0471; B60C 23/0479
USPC ........................................................ 340/447
See application file for complete search history.

(56) References Cited

U.S. PATENT DOCUMENTS 6,087,930 A * 7/2000 Kulka ................ B60C 23/0462 340/447
7,250,852 B1 * 7/2007 Kell ................... B60C 23/0479 340/447
8,373,581 B2 * 2/2013 Hassan ................ G01S 13/825 455/414.3
2002/0126005 A1 9/2002 Hardman et al.
2003/0156021 A1 * 8/2003 Tabata ............... B60C 23/0416 340/442

(Continued)

FOREIGN PATENT DOCUMENTS

EP 2949485 A1 12/2015

OTHER PUBLICATIONS

International Search Report and Written Opinion, PCT/US2020/038151, Feb. 26, 2021, 10 pages.

*Primary Examiner* — Eric Blount

(57) ABSTRACT

Methods, systems, apparatuses, and computer program products for persistent alarm transmissions associated with a vehicle mounted wireless sensor device are disclosed. In a particular embodiment, persistent alarm transmission includes a vehicle mounted wireless sensor device monitoring one or more operational parameters of a vehicle and detecting that the one or more operational parameters violates a configurable threshold that is configured by another device. In response to detecting that the one or more operational parameters violates the configurable threshold, the vehicle mounted wireless sensor device persistently transmits an alarm message.

20 Claims, 17 Drawing Sheets

(56) References Cited

U.S. PATENT DOCUMENTS

2019/0118589 A1* 4/2019 Patel .................. B60C 23/0471

* cited by examiner

100

109
103
105
101
115
105
103
Vehicle Control System (VCS) 107
Vehicle Sensors 109
Vehicle Mounted Wireless Sensor Device 105
Tire 103
105
103
105
103

105
103
103
100
101
109
107
103
109
103
103
105

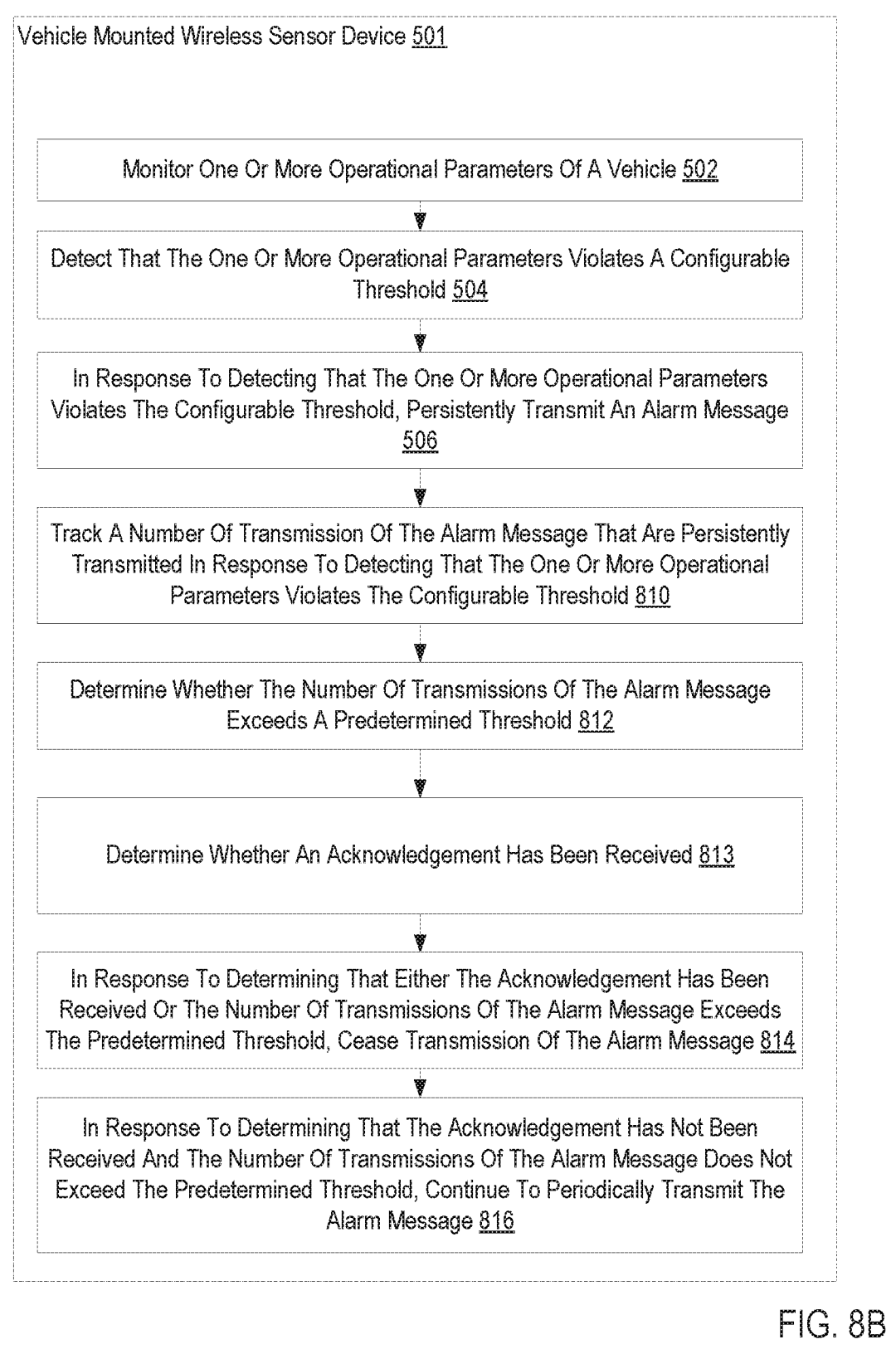

Vehicle Mounted Wireless Sensor Device 501

Monitor One Or More Operational Parameters Of A Vehicle 502

Detect That The One Or More Operational Parameters Violates A Configurable Threshold 504

In Response To Detecting That The One Or More Operational Parameters Violates The Configurable Threshold, Persistently Transmit An Alarm Message 506

Track A Number Of Transmission Of The Alarm Message That Are Persistently Transmitted In Response To Detecting That The One Or More Operational Parameters Violates The Configurable Threshold 810

Determine Whether The Number Of Transmissions Of The Alarm Message Exceeds A Predetermined Threshold 812

Determine Whether An Acknowledgement Has Been Received 813

In Response To Determining That Either The Acknowledgement Has Been Received Or The Number Of Transmissions Of The Alarm Message Exceeds The Predetermined Threshold, Cease Transmission Of The Alarm Message 814

In Response To Determining That The Acknowledgement Has Not Been Received And The Number Of Transmissions Of The Alarm Message Does Not Exceed The Predetermined Threshold, Continue To Periodically Transmit The Alarm Message 816

FIG. 8B

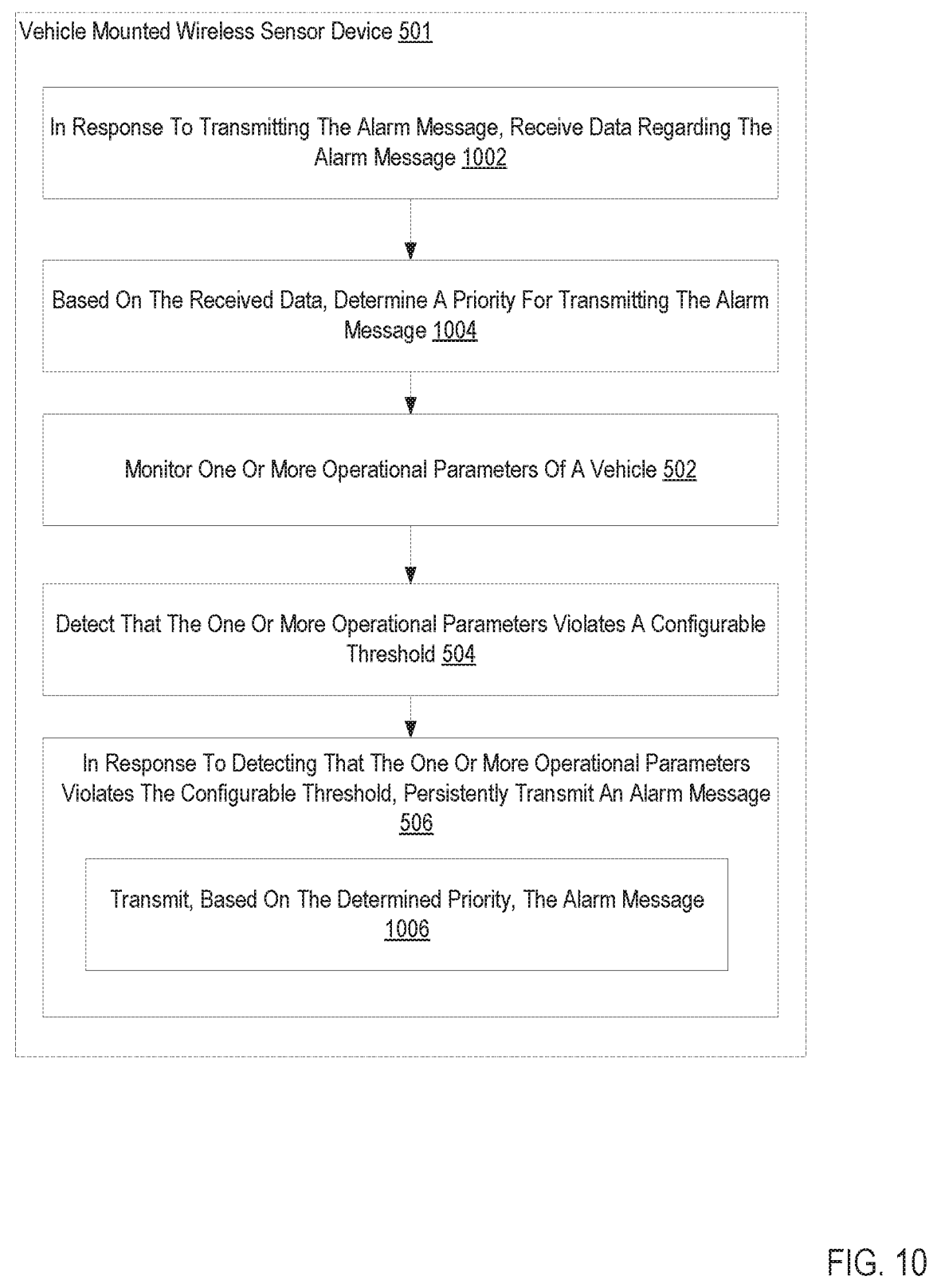

Vehicle Mounted Wireless Sensor Device 501

In Response To Transmitting The Alarm Message, Receive Data Regarding The Alarm Message 1002

Based On The Received Data, Determine A Priority For Transmitting The Alarm Message 1004

Monitor One Or More Operational Parameters Of A Vehicle 502

Detect That The One Or More Operational Parameters Violates A Configurable Threshold 504

In Response To Detecting That The One Or More Operational Parameters Violates The Configurable Threshold, Persistently Transmit An Alarm Message 506

Transmit, Based On The Determined Priority, The Alarm Message 1006

FIG. 10

PERSISTENT ALARM TRANSMISSION ASSOCIATED WITH A VEHICLE MOUNTED WIRELESS SENSOR DEVICE

BACKGROUND

Wireless vehicle sensors, such as wireless tire pressure monitoring system (TPMS) sensors, have been introduced to provide vehicle sensor data to a vehicle control system over a radio frequency (RF) link. In particular, wireless TPMS sensors have been introduced to the majority of car markets across the globe, with many regions having legislation requiring the system for safety or environmental reasons. The system is designed to alert the driver of under inflated tire(s). Current systems, such as TPMS, typically employ a unidirectional RF link from the sensor to the vehicle to transmit key data for the sensing application. This data could include pressure, temperature, position, speed/acceleration, unique ID or stimulus, among others. For example, Tire Fill Assist (TFA) is a TPMS feature that has been implemented using the current unidirectional RF link to the vehicle. This feature allows the vehicle to communicate the status of the TPMS to the user, for example by using the horn and/or lights as feedback.

Bluetooth Low Energy (BLE) is a common short-range wireless standard that may be used for bidirectional communication with a wireless vehicle sensor. As the automotive industry moves towards wireless vehicle architectures that use BLE, new methods are required for manufacturing and service processes. New automotive sensors using BLE could include TPMS, wireless brake pad wear sensors, and wireless seat buckle sensors.

Moving to a RF technology that has bi-directional capability does bring additional functionality to a wireless sensor, however, when battery life is very restricted (as is the case with TPMS) it is not possible to make full use of the capability. As with the current systems, RF transmissions and receive windows must be restricted to conserve battery capacity to meet the typical ten-year design life of an automotive sensor.

SUMMARY

Methods, systems, apparatuses, and computer program products for persistent alarm transmissions associated with a vehicle mounted wireless sensor device are disclosed. In a particular embodiment, persistent alarm transmission includes a vehicle mounted wireless sensor device monitoring one or more operational parameters of a vehicle and detecting that the one or more operational parameters violates a configurable threshold that is configured by another device. In response to detecting that the one or more operational parameters violates the configurable threshold, the vehicle mounted wireless sensor device persistently transmits an alarm message.

In another embodiment, persistent alarm transmission includes a wireless device establishing a wireless connection between the wireless device and a vehicle mounted wireless sensor device. In this embodiment, the wireless device transmits to the vehicle mounted wireless sensor device via the wireless connection, data for configuring alarm transmission procedures of the vehicle mounted wireless sensor device.

As explained above, wireless transmission may be one of the largest drains on a battery of a wireless sensor device. In order to conserve battery life, some prior art systems rely on a sensor device minimizing the frequency and duration that the device transmits measured sensor readings. However, by using a configurable threshold in accordance with embodiments of the present disclosure, another device (e.g., a vehicle control system) may set the alarm threshold of the vehicle mounted wireless sensor device to correspond with a critical threshold of a system. By only transmitting an alarm message when a critical threshold of a system is violated, the vehicle mounted wireless sensor device may send fewer alarm messages and thus reduce battery consumption.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 8B sets forth a flowchart of another example method for persistent alarm transmissions associated with a vehicle mounted wireless sensor device in accordance with the present disclosure;

FIG. 10 sets forth a flowchart of another example method for persistent alarm transmissions associated with a vehicle mounted wireless sensor device in accordance with the present disclosure;

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1A:
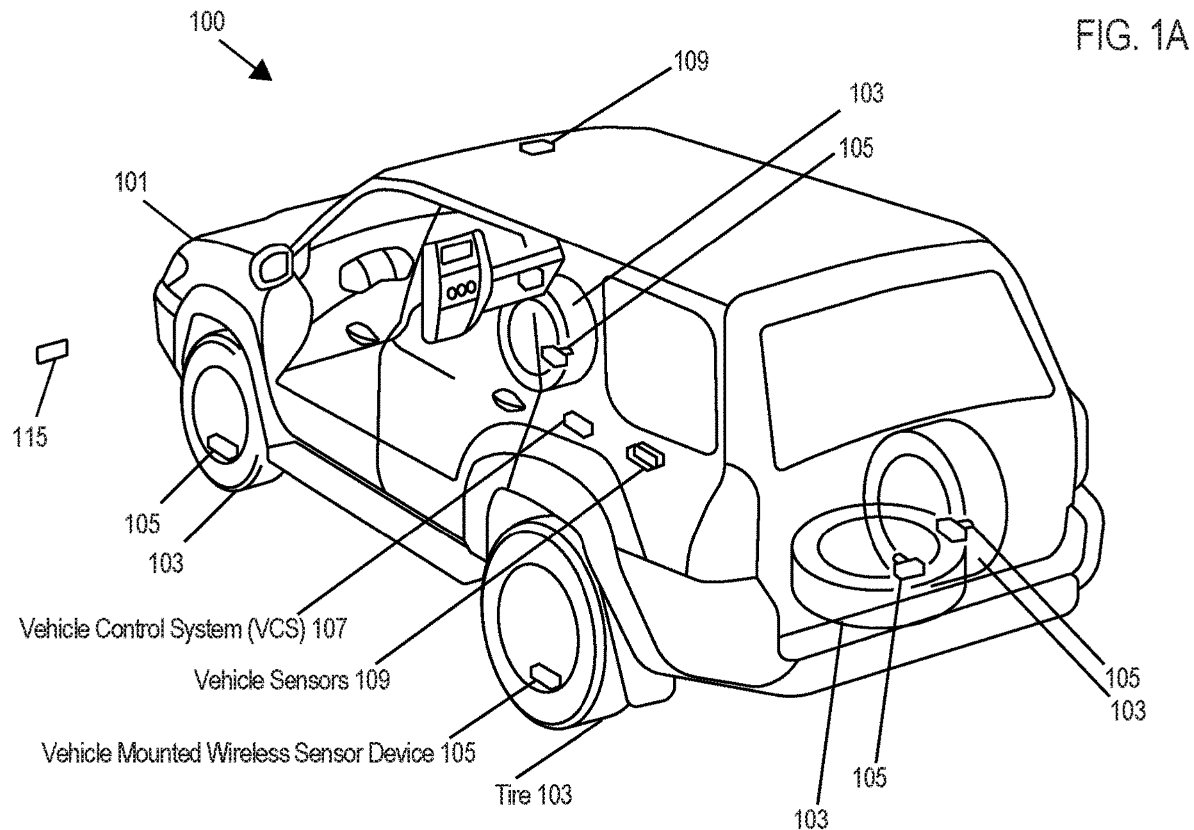
FIG. 1A sets forth an isometric diagram of a system for persistent alarm transmissions associated with a vehicle mounted wireless sensor device in accordance with the present disclosure.
Figure 1B:
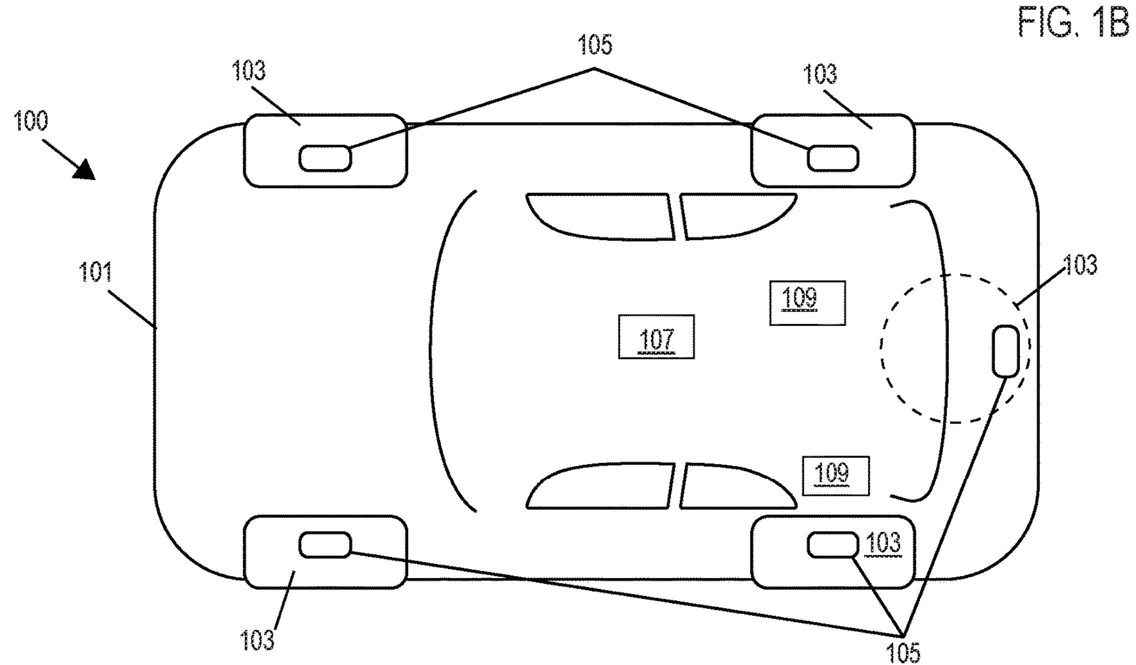
FIG. 1B sets forth a top view of the system of FIG. 1A.

Exemplary methods, apparatuses, and computer program products for persistent alarm transmissions associated with a vehicle mounted wireless sensor device in accordance with the present disclosure are described with reference to the accompanying drawings, beginning with FIG. 1A and FIG. 1B. FIG. 1A sets forth an isometric diagram of a system (100) for persistent alarm transmissions associated with a vehicle mounted wireless sensor device in accordance with the present disclosure. FIG. 1B sets forth a top view of the system of FIG. 1A. The system of FIGS. 1A and 1B includes a vehicle (101) equipped with tires (103) and a vehicle mounted wireless sensor device (105). A vehicle mounted sensor device may include any sensors mounted to components associated with the vehicle including tire mounted sensors and wheel mounted sensors. While the embodiment of FIGS. 1A and 1B shows the vehicle mounted wireless sensor device is a tire monitoring device (e.g., a TPMS sensor) for the tire (103), it will be appreciated that the vehicle mounted wireless sensor device (105) may be any vehicle mounted wireless sensor device that is configured for wireless communication, including but not limited to brake pad wear sensors, seat buckle sensors, and other wireless automotive sensors (109). In a particular embodiment, the vehicle mounted wireless sensor device (105) is a tire pressure monitoring system (TPMS) sensor that measures operational characteristics of the tire, such as tire pressure, tire temperature, and motion characteristics, and communicates the collected data to a vehicle control system (VCS) (107).

The VCS (107) controls various components and systems within a vehicle. For example, the VCS (107) may include a plurality of electronic control units (ECUs) that are configured to control one or more vehicle subsystems. Commonly referred to as the vehicle's "computers", an ECU may be a central control unit or may refer collectively to one or more vehicle subsystem control units. In a particular embodiment, one of the subsystems in the VCS (107) is a TPMS that receives tire pressure and other measurements from the vehicle mounted wireless sensor device (105). Other subsystems may include an Engine Control Module (ECM), a Powertrain Control Module (PCM), a Transmission Control Module (TCM), a Body Control Module (BCM), a Central Timing Module (CTM), a General Electronic Module (GEM), a Remote Keyless Entry Module, and/or a Suspension Control Module (SCM). In an embodiment according to the present disclosure, the VCS (107) includes a BCM that includes an Antilock Braking System (ABS) and an Electronic Stability Program (ESP). Alternatively, the VCS (107) may comprise a Telematics Control Unit (TCU) independent of vehicle-based sensors (e.g., an aftermarket system).

The vehicle mounted wireless sensor device (105) may be equipped with a wireless transceiver for bidirectional wireless communication with the VCS (107), as will be described in more detail below. The VCS (107) may be similarly equipped with a wireless transceiver for bidirectional wireless communication with each vehicle mounted wireless sensor device (105), as will be described in more detail below. The bidirectional wireless communication may be realized by communication technology such as Bluetooth Low Energy, Bluetooth Smart, or other low power bidirectional communication technology that is intended to reduce/minimize energy consumed. Alternatively, the vehicle mounted wireless sensor device (105) may include a unidirectional transmitter configured to transmit signals to other devices, sensors, and systems, such as for example, the VCS (107).

In a particular embodiment, the vehicle mounted wireless sensor device (105) is configured to monitor one or more operational parameters of a vehicle and detect that the one or more operational parameters violates a configurable threshold that is configured by another device (e.g., a wireless device (115) or the VCS (107). In this example, the vehicle mounted wireless sensor device may be configured to in response to detecting that the one or more operational parameters violates the configurable threshold, persistently transmit an alarm message. An alarm message is an unscheduled message providing an indication regarding the status of an operational parameter of the vehicle. Examples of alarm messages include but are not limited to a low tire pressure warning, a critical low tire pressure warning, a high tire pressure warning, a critical high tire pressure warning, a high tire temperature warning, and others as will occur to those of skill in the art.

In a particular embodiment, the vehicle mounted wireless sensor device (105) may be configurable by the wireless device (115). For example, the wireless device (115) may be configured to establish a wireless connection between the wireless device and the vehicle mounted wireless sensor device (105) and transmit to the vehicle mounted wireless sensor device (105) via the wireless connection, data for configuring alarm transmission procedures of the vehicle mounted wireless sensor device (105). Examples of alarm transmission procedures include but are not limited to an indication of which alarm message should be transmitted if multiple alarm messages are triggered for transmission; indication of which devices should be contacted; indication of what conditions are required for stopping transmission of the alarm message (e.g., duration, devices that must send an acknowledgement).

The arrangement of devices making up the exemplary system illustrated in FIG. 1A and FIG. 1B are for explanation, not for limitation. Data processing systems useful according to various embodiments of the present disclosure may include additional servers, routers, other devices, and peer-to-peer architectures, not shown in FIG. 1A and FIG. 1B, as will occur to those of skill in the art. The devices of FIG. 1A and FIG. 1B and other data processing systems may utilize communications protocols in accordance with embodiments of the present disclosure, including but not limited to TCP (Transmission Control Protocol), IP (Internet Protocol), Bluetooth protocol, Near Field Communication, Controller Area Network (CAN) protocol, Local Interconnect Network (LIN) protocol, Serial Peripheral Interface (SPI) protocol, FlexRay protocol, and others as will occur to those of skill in the art. Various embodiments of the present disclosure may be implemented on a variety of hardware platforms in addition to those illustrated in FIG. 1A and FIG. 1B.

Figure 2:
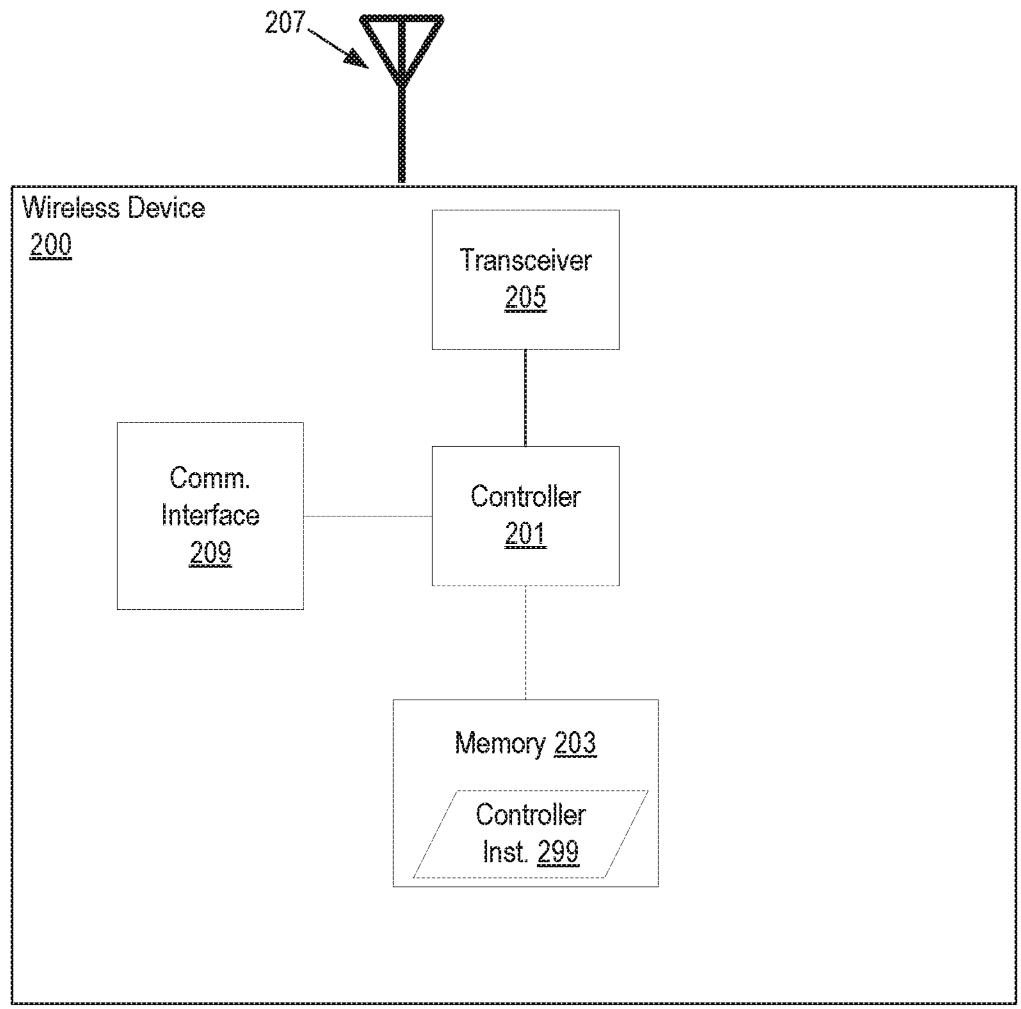
FIG. 2 sets forth a block diagram of an exemplary wireless device in accordance with the present disclosure.

For further explanation, FIG. 2 sets forth a diagram of an exemplary implementation of a wireless device (200) that may be configured for persistent alarm transmissions associated with a vehicle mounted wireless sensor device according to embodiments of the present disclosure. The wireless device (200) of FIG. 2 may include a controller (201), a memory (203), a transceiver (205), an antenna (207), and a vehicle communications interface (209), which may include a wireless communication interface (e.g, Low Frequency (LF) and Near Field Communication (NFC)) and/or a wired communication interface (e.g., an interface for a plug-in tool). Examples of wireless devices include but are not limited to a handheld specially configured tool device, a mobile phone device, a smartphone, a smartwatch, a wearable device, a computing device (e.g., laptop, desktop computer), and others as will occur to those of skill in the art.

Figure 3:
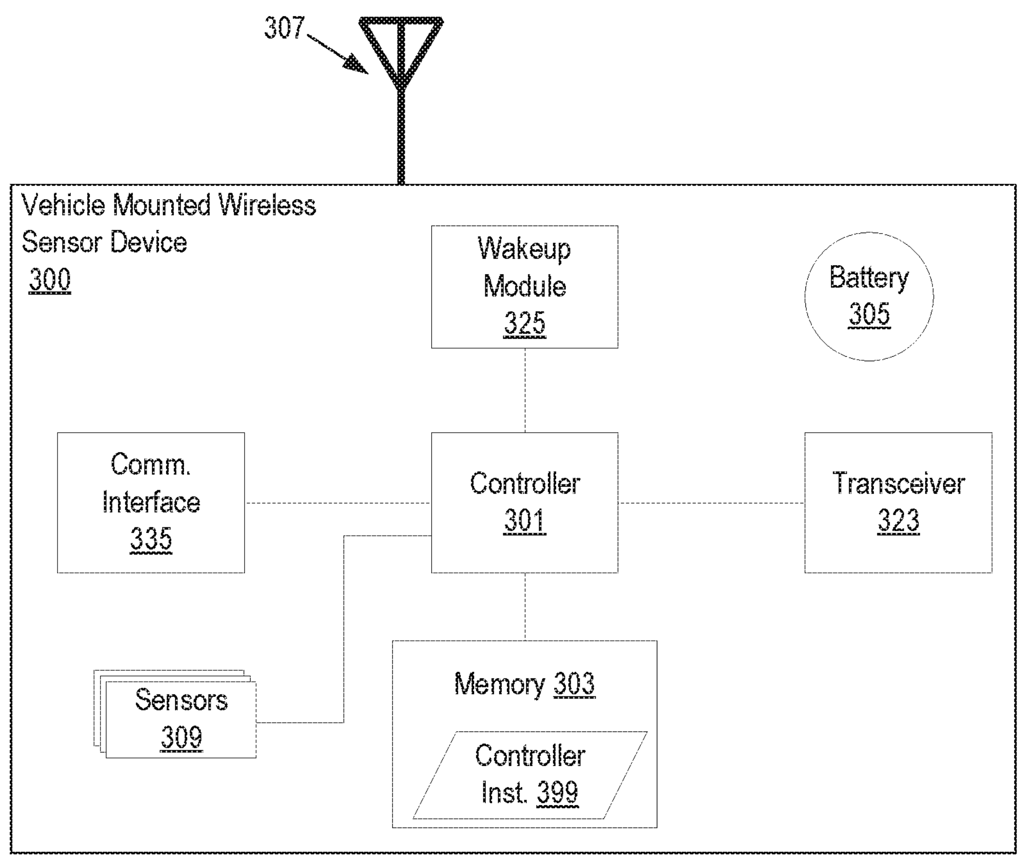
FIG. 3 sets forth a block diagram of an exemplary vehicle mounted wireless sensor device in accordance with the present disclosure.

The controller (201) of the wireless device (200) may be configured to establish a wireless connection with a vehicle mounted wireless sensor device (e.g., vehicle mounted wireless sensor device (300) of FIG. 3), and may comprise a suitably programmed processor, for example a dedicated microprocessor or a microcontroller, or other programmable processing device. Standard components such as random access memory (RAM), an analog-to-digital converter (ADC), an input/output (I/O) interface, a clock, and a central microprocessor (all not shown) may be provided, the components typically being integrated onto a single chip. Alternatively, or additionally, a custom microcontroller such as an Application Specific Integrated Circuit (ASIC), a digital signal processor (DSP), a programmable logic array (PLA) such as a field programmable gate array (FPGA), or other data computation unit in accordance with the present disclosure may be used.

The transceiver (205) of the wireless device may be coupled to the controller (201) and the antenna (207), and may be configured for bidirectional wireless communication with the wireless sensor device and, in some embodiments, the VCS. The transceiver (205) may be configured for operation within a particular RF band, such as the Industrial, Scientific and Medical (ISM) 2.4 GHz band with a frequency range of 2.4 GHz to 2.5 GHz that includes an unlicensed portion of the RF spectrum. In a particular embodiment, the transceiver (205) may be a Bluetooth protocol transceiver, such as a Bluetooth Low Energy transceiver or a Bluetooth Smart transceiver, operating between 2.4 GHz and 2.4835 GHz. In an embodiment, the transceiver (205) may be further configured to transmit a 2.4 GHz band wake-up signal to a low power receiver of the wireless sensor device to transition the wireless sensor device from a standby state to an active state where a transceiver of the wireless sensor device is brought online.

In the example of FIG. 2, the memory (203) includes sensor controller instructions (299) that includes computer program instructions that when executed by the controller (201) cause the wireless device (200) to establish a wireless connection between the wireless device and a vehicle mounted wireless sensor device and transmit to the vehicle mounted wireless sensor device via the wireless connection, data for configuring alarm transmission procedures of the vehicle mounted wireless sensor device.

For further explanation, FIG. 3 sets forth a diagram of an exemplary implementation of a vehicle mounted wireless sensor device (300) for persistent alarm transmissions associated with a vehicle mounted wireless sensor device according to embodiments of the present disclosure. The vehicle mounted wireless sensor device (300) of FIG. 3 may include a controller (301), a memory (303), a battery (305), a transceiver (323), a wakeup module (325), and an antenna (307). In a particular embodiment, the vehicle mounted wireless sensor device may be a tire monitoring device and may include one or more sensors (309), such as a pressure sensor (e.g. a piezo resistive transducer or a piezoelectric or capacitance based pressure sensor for measuring air pressure in a respective tire), a temperature sensor, and a motion sensor (e.g., an accelerometer responsive to acceleration and/or changes in acceleration experienced during rotation of a respective tire).

Figure 4:
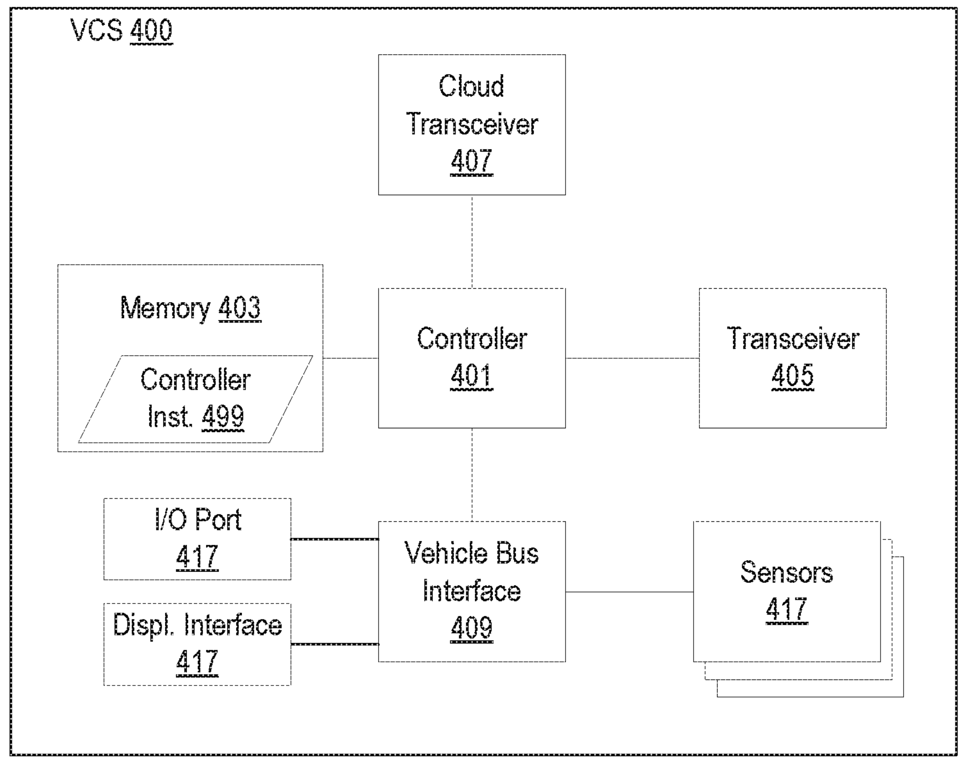
FIG. 4 sets forth a block diagram of an exemplary vehicle control system in accordance with the present disclosure.

The controller (301) of the vehicle mounted wireless sensor device (300) may be configured to pair the vehicle mounted wireless sensor device (300) with a VCS (e.g., the VCS (400) of FIG. 4) and to provide sensor data (e.g., tire pressure, brake pad wear, etc.) to the VCS. The controller (301) of the vehicle mounted wireless sensor device (300) may also be configured to pair with a user device (e.g., a smart phone) and to provide sensor data (e.g., tire fill assist data) to the user device, as will be explained below. The controller (301) of the vehicle mounted wireless sensor device (300) may comprise a suitably programmed processor, for example a dedicated microprocessor or a microcontroller, or other programmable processing device. Standard components such as random access memory (RAM), an analog-to-digital converter (ADC), an input/output (I/O)

interface, a clock, and a central microprocessor (all not shown) may be provided with the components typically being integrated onto a single chip. Alternatively, or additionally, a custom microcontroller such as an Application Specific Integrated Circuit (ASIC), a digital signal processor (DSP), a programmable logic array (PLA) such as a field programmable gate array (FPGA), or other data computation unit in accordance with the present disclosure may be used.

The transceiver (323) of the vehicle mounted wireless sensor device (300) may be coupled to the controller (301) and the antenna (307), and may be configured for bidirectional wireless communication with other wireless modules, including but not limited to the VCS, a wireless device, and a user device (e.g., a smartphone). Once the transceiver (323) is paired with a wireless transceiver of the VCS, the transceiver (323) may be used to transmit sensor data (e.g., tire pressure) to the VCS and receive vehicle-provided parameters (e.g., identity information for credentialed devices) and configuration parameters from the VCS. As yet another example, once the transceiver (323) has received identity information for a credentialed device, the transceiver (323) may be used to communicate with the credentialed device such as the user device.

The transceiver (323) may be configured for operation within a particular RF band, such as the ISM 2.4 GHz band with a frequency range of 2.4 GHz to 2.5 GHz that includes an unlicensed portion of the RF spectrum. In a particular embodiment, the transceiver (323) may be a Bluetooth protocol transceiver, such as a Bluetooth Low Energy transceiver or a Bluetooth Smart transceiver, operating between 2.4 GHz and 2.4835 GHz. In other embodiments, the transceiver (323) may be other types of low power radio frequency communication technology that is intended to conserve energy consumed in the vehicle mounted wireless sensor device (300).

The wakeup module (325) may be configured to receive an activation signal from the wireless device (e.g., the wireless device (200) of FIG. 2) or other remote device. In one embodiment, the wakeup module (325) may be a Near Field Communication (NFC) system. In an embodiment, the wakeup module may be a low frequency (LF) system comprising an LF coil with associated tuning capacitors, an LF amplifier circuitry, and a decoding circuit (all not shown). The LF system may detect a signal (e.g., 125 kHz signal) from the remote device via the LF coil and provides a wakeup signal to the controller (301). In another embodiment, the wakeup module (325) may be a low power receiver configured to receive an activation signal from the wireless device or other remote device and provide a wakeup signal to the controller (301). The low power receiver may be configured for communication within the same RF band as the transceiver (323) (i.e., the ISM 2.4 GHz band with a frequency range of 2.4 GHz to 2.5 GHZ).

The vehicle mounted wireless sensor device (300) may also include a communications interface (335) for organizing data according to communications protocols for transmitting and receiving data via the transceiver (323). For example, the communications interface (335) may encapsulate data in packets in accordance with the Bluetooth protocol. The vehicle mounted wireless sensor device (300) may also include a power interface (339) for supplying power received from the battery (305) to the various components of the vehicle mounted wireless sensor device (300).

The battery (305) may provide power to the power interface (339) of the vehicle mounted wireless sensor device (300). However, it is also contemplated that other power sources may be used (e.g., thermoelectric or piezoelectric generators, electromagnetic induction device, and/or other energy harvesters) instead of or in addition to the battery (305).

The antenna (307) may be used by the vehicle mounted wireless sensor device (300) to transmit and receive RF signals. The antenna (307) may be coupled to the transceiver (323) for transmitting and receiving RF signals. The antenna (307) may also be coupled to the wakeup module (325) for receiving an RF activation signal.

The memory (305) may be a non-volatile memory (e.g., flash memory) that stores sensor data and configuration parameters. In the example of FIG. 3, the memory (303) also includes controller instructions (399) having computer program instructions that when executed by the controller (301) cause the vehicle mounted wireless sensor device to monitor one or more operational parameters of a vehicle; detect that the one or more operational parameters violates a configurable threshold that is configured by another device; and in response to detecting that the one or more operational parameters violates the configurable threshold, persistently transmit an alarm message.

For further explanation, FIG. 4 sets forth a diagram of an exemplary vehicle control system (VCS) (400) for persistent alarm transmissions associated with a vehicle mounted wireless sensor device according to embodiments of the present disclosure. The VCS (400) includes a VCS controller (401) coupled to a memory (403) and a transceiver (405). The VCS controller (401) may be configured to obtain sensor readings and alarm messages related to vehicle operating conditions (e.g., from the vehicle mounted wireless sensor device (300) of FIG. 3).

The VCS controller (401) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data, as well as tire feature data received from the tire monitoring device, may be stored in the memory (403). The memory (403) may be a non-volatile memory such as flash memory. For example, the VCS (400) may obtain vehicle operating condition data such as sensor readings from sensors onboard the vehicle and/or vehicle tires.

In the example of FIG. 4, the memory (403) includes sensor controller instructions (499) that includes computer program instructions that when executed by the controller (401) cause the VCS (400) to establish a wireless connection between the VCS and a vehicle mounted wireless sensor device and transmit to the vehicle mounted wireless sensor device via the wireless connection, data for configuring alarm transmission procedures of the vehicle mounted wireless sensor device.

For bidirectional wireless communication with a vehicle mounted wireless sensor device, the wireless device, and the external wireless device, the VCS (400) may include a transceiver (405) coupled to the VCS controller (401). In a particular embodiment, the transceiver and the controller may be part of one device. For example, once the transceiver (405) is paired with a wireless transceiver of the vehicle mounted wireless sensor device, the transceiver (405) may be used to receive sensor parameters (e.g., tire pressure) from the vehicle mounted wireless sensor device, and to transmit to the vehicle mounted wireless sensor device, configuration data for configuring alarm transmission procedures of the vehicle mounted wireless sensor device.

The transceiver (405) may be configured for operation within a particular RF band, such as the ISM 2.4 GHz band with a frequency range of 2.4 GHz to 2.5 GHz that includes an unlicensed portion of the RF spectrum. In one embodiment, the transceiver (405) may be a Bluetooth protocol transceiver. The VCS (400) may further include a cloud transceiver (407) for cellular terrestrial communication, satellite communication, or both. For example, the cloud transceiver (407) may be used to communicate tire parameters (e.g., tire pressure) to a remote server. The cloud transceiver (407) may also be used to receive configuration parameters for the vehicle.

The VCS (400) may further comprise a vehicle bus interface (409) for communicatively coupling vehicle sensors (417) and devices to the controller (401), such as wheel speed sensors, a yaw rate sensor, an inclination sensor, and other sensors, to the controller (401). The vehicle bus interface (409) may couple an I/O port (415) to the controller (401). The vehicle bus interface (409) may also couple a display interface (419) to the controller (401). The display interface (419) may be used to output indicia of vehicle sensor parameters (e.g., tire pressure parameters) to a dashboard or display of the vehicle. For example, the display port may be used to output tire pressure indicia to the dashboard or display to warn the driver about low tire pressure detected in a tire by a tire monitor device.

Figure 5:
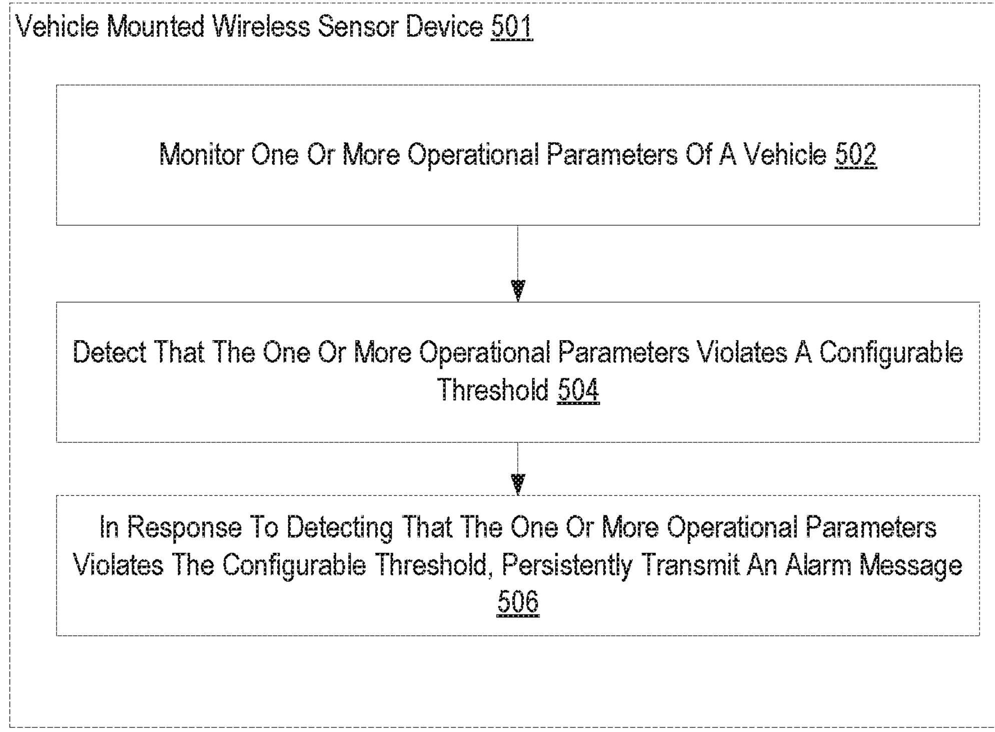
FIG. 5 sets forth a flowchart of an example method for persistent alarm transmissions associated with a vehicle mounted wireless sensor device in accordance with the present disclosure.

For further explanation, FIG. 5 sets forth a flow chart illustrating an exemplary method for persistent alarm transmissions associated with a vehicle mounted wireless sensor device according to embodiments of the present disclosure that includes a vehicle mounted wireless sensor device (501) monitoring (502) one or more operational parameters of a vehicle. A vehicle mounted wireless sensor device may be any type of sensor device that is mounted within or on a vehicle and is capable of wireless communication. Examples of vehicle mounted wireless sensor device include but are not limited to tire mounted sensors, wheel mounted sensors, valve-stem mounted sensors, tire pressure monitoring system (TPMS) sensor, wireless brake pad sensors, and wireless seat buckle sensors. Examples of operational parameters of a vehicle include but are not limited to tire temperature and pressure; brake pad wear levels; fluid levels; and binary indicator of whether a buckle is fastened or open. Monitoring (502) one or more operational parameters of a vehicle may be carried out by the vehicle mounted wireless sensor device capturing data using one or more sensors; storing the data within the sensor device; processing the data; and transmitting the data or processed data resulted from the processing of the data.

The method of FIG. 5 also includes detecting (504), by the vehicle mounted wireless sensor device (501), that the one or more operational parameters violates a configurable threshold. A configurable threshold is a threshold that can be changed, modified, or overwritten by another device. In a particular embodiment, the value of the configurable threshold may be selected to match a vehicle system's critical threshold of an operational parameter of a vehicle. For example, in a tire pressure monitoring system (TPMS), if the tire pressure of a tire goes below a particular critical threshold, the TPMS may alert a user via a dashboard icon of the tire's low tire pressure. As another example, in the TPMS, if the tire pressure of a tire goes above a another particular critical threshold, the TPMS may alert a user via a dashboard icon of the tire's high tire pressure.

As will be explained below, the vehicle mounted wireless sensor device may be configured to receive, from a vehicle system (e.g., a vehicle control system (VCS)) or a user via a wireless device (e.g., a mobile phone), the configurable threshold and an indication of how to determine whether the threshold has been violated. For example, in a particular embodiment, a vehicle control system may be concerned with whether a first operational parameter from a first vehicle mounted wireless sensor device exceeds a first configurable threshold and whether a second operational parameter from a second vehicle mounted wireless sensor device is less than a second configurable threshold. Detecting (504), by the vehicle mounted wireless sensor device (501), that the one or more operational parameters violates a configurable threshold may be carried out by comparing the measured operational parameter to the threshold; determining whether the measured operational parameter has a value that exceeds the threshold; and determining whether the measured operational parameter has a value that is below the threshold.

The method of FIG. 5 also includes in response to detecting that the one or more operational parameters violates the configurable threshold, persistently transmitting (506), by the vehicle mounted wireless sensor device (501), an alarm message. An alarm message is an unscheduled message providing an indication regarding the status of an operational parameter of the vehicle. Examples of alarm messages include but are not limited to low tire pressure warning, critical low tire pressure warning, high tire pressure warning, critical high tire pressure warning, high tire temperature warning, and others as will occur to those of skill in the art. Persistently transmitting (506), by the vehicle mounted wireless sensor device (501), an alarm message in response to detecting that the one or more operational parameters violates the configurable threshold may be carried out by wirelessly transmitting an alarm message to a vehicle control system or another wireless device (e.g., a user's mobile phone) for a duration that is greater than normal or more frequent than normal.

As explained above, wireless transmission may be one of the largest drains on a battery of a wireless sensor device. In order to conserve battery life, some prior art systems rely on a sensor device minimizing the frequency and duration that the device transmits measured sensor readings. However, by using a configurable threshold in accordance with embodiments of the present disclosure, another device (e.g., a vehicle control system) may set the alarm threshold of the vehicle mounted wireless sensor device to correspond with a critical threshold of a system. By only transmitting an alarm message when a critical threshold of a system is violated, the vehicle mounted wireless sensor device may potentially send more alarm messages due to a critical threshold violation, but fewer alarm messages over the life of the sensor and thus reduce battery consumption.

Figure 6:
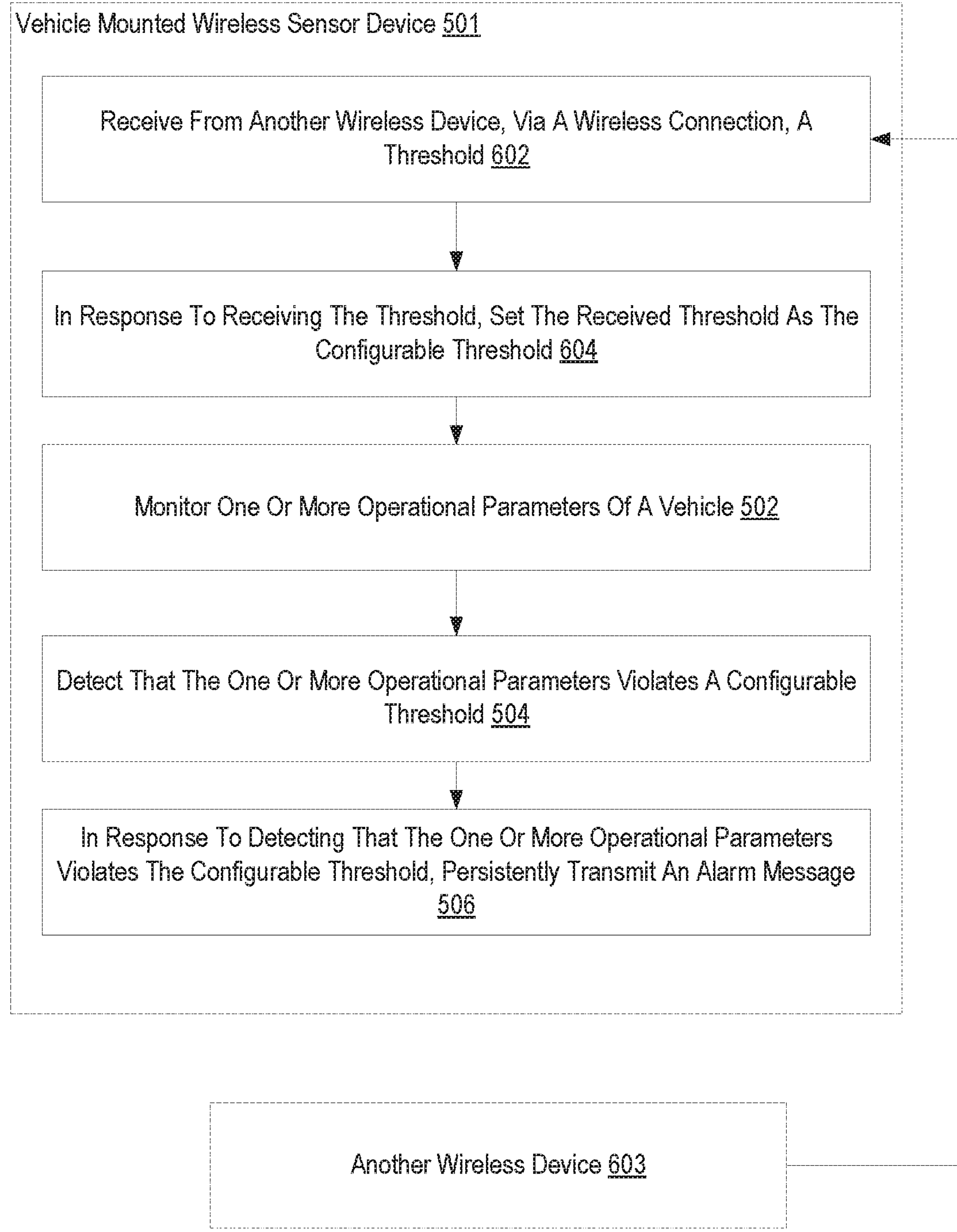
FIG. 6 sets forth a flowchart of another example method for persistent alarm transmissions associated with a vehicle mounted wireless sensor device in accordance with the present disclosure.

For further explanation, FIG. 6 sets forth a flow chart illustrating another exemplary method for persistent alarm transmissions associated with a vehicle mounted wireless sensor device according to embodiments of the present disclosure. Like the exemplary method of FIG. 5, the method of FIG. 6 also includes monitoring (502), by the vehicle mounted wireless sensor device (501), one or more operational parameters of a vehicle; detecting (504), by the vehicle mounted wireless sensor device (501), that the one or more operational parameters violates a configurable threshold; and in response to detecting that the one or more operational parameters violates the configurable threshold, persistently transmitting (506), by the vehicle mounted wireless sensor device (501), an alarm message.

The method of FIG. 6 differs from the method of FIG. 5 in that the method of FIG. 6 also includes receiving (602)

from another wireless device (603), via a wireless connection, by the vehicle mounted wireless sensor device (501), a threshold. A wireless device may include any type of wireless device that is capable of wireless communicating configuration data to the vehicle mounted wireless sensor. Examples of wireless devices include but are not limited to handheld sensor configuration devices, sensor pairing devices, mobile devices, mobile phones, and vehicle controls systems (VCS). Receiving (602) from another wireless device (603), via a wireless connection, by the vehicle mounted wireless sensor device (501), a threshold may be carried out by receiving from the wireless device, configuration data that includes an indication of the new threshold and how the threshold is violated (e.g., by exceeding the threshold or by being below the threshold).

In addition, the method of FIG. 6 also includes in response to receiving the threshold, setting (604), by the vehicle mounted wireless sensor device (501), the received threshold as the configurable threshold. Setting (604), by the vehicle mounted wireless sensor device (501), the received threshold as the configurable threshold in response to receiving the threshold may be carried out by overwriting the value of the configurable threshold with the received threshold; setting one or more flags to indicate how the threshold is violated.

For example, in a tire pressure monitoring systems (TPMS), a TPMS sensor may be configured to monitor tire pressure and temperature of a tire and periodically transmit the readings to a component of the vehicle control system (e.g., a TPMS controller). During a normal drive, the TPMS sensor may periodically transmit the tire temperature and pressure data to the TPMS controller once per minute. Additionally, the sensor may initiate an alarm transmission on a significant change in pressure. Pressure change is a normal event during and after a driving event as the changes in dynamic load and temperature may cause pressure variation. To persist radio frequency (RF) alarm message transmission on every one of these changes could have a significant negative impact on battery life when compared to only transmitting on occasions when a pressure change has violated a critical threshold. Using user or vehicle data, the TPMS sensor may set the configurable parameter to the critical threshold, such that the TPMS sensor may only transmit the alarm message when a change in pressure has resulted in a tire condition that should result in a change in the vehicle system.

Figure 7:
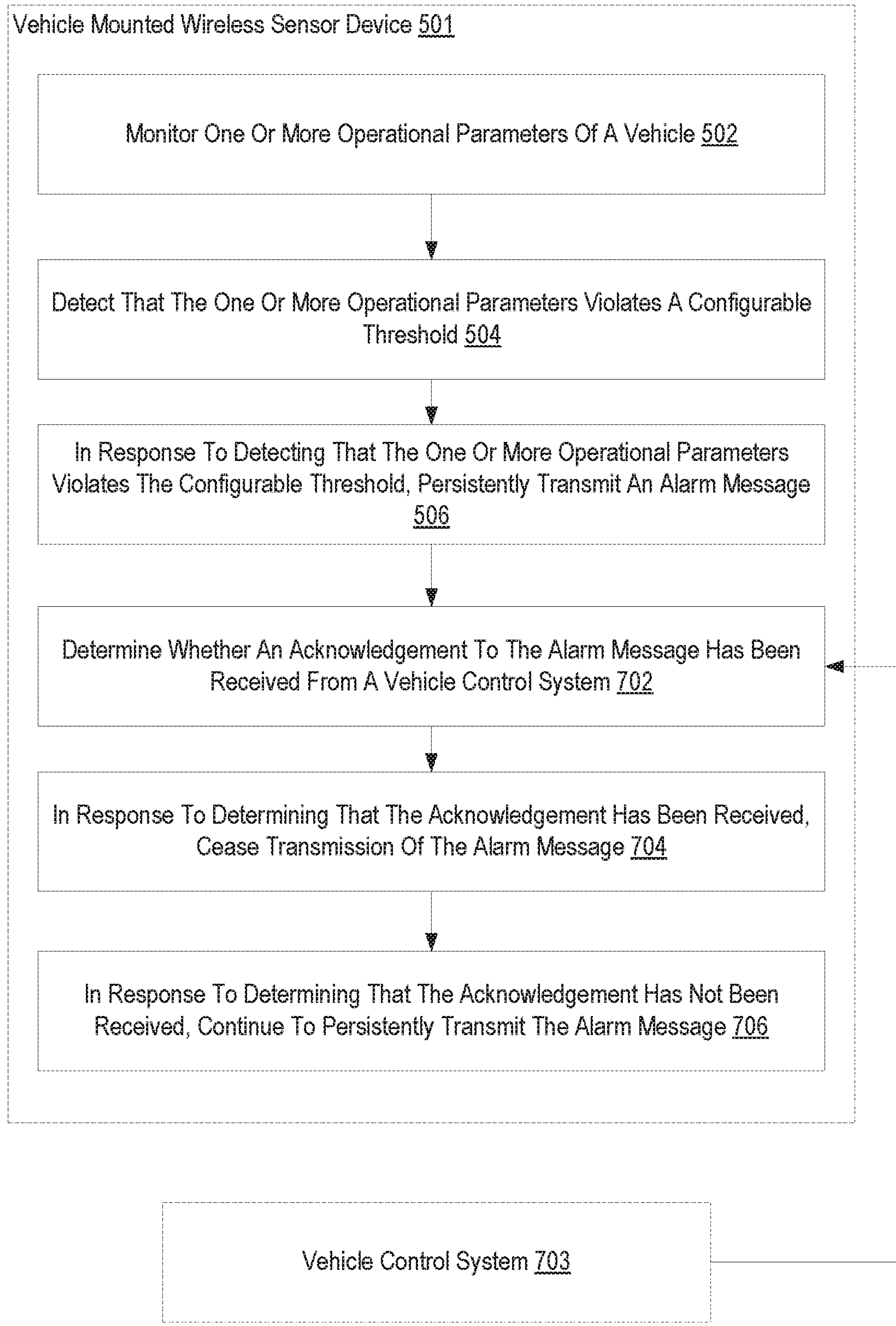
FIG. 7 sets forth a flowchart of another example method for persistent alarm transmissions associated with a vehicle mounted wireless sensor device in accordance with the present disclosure.

For further explanation, FIG. 7 sets forth a flow chart illustrating an exemplary method for persistent alarm transmissions associated with a vehicle mounted wireless sensor device according to embodiments of the present disclosure. Like the exemplary method of FIG. 5, the method of FIG. 7 also includes monitoring (502), by the vehicle mounted wireless sensor device (501), one or more operational parameters of a vehicle; detecting (504), by the vehicle mounted wireless sensor device (501), that the one or more operational parameters violates a configurable threshold; and in response to detecting that the one or more operational parameters violates the configurable threshold, persistently transmitting (506), by the vehicle mounted wireless sensor device (501), an alarm message.

The method of FIG. 7 differs from the method of FIG. 5 in that the method of FIG. 7 also includes determining (702), by the vehicle mounted wireless sensor device (501), whether an acknowledgement to the alarm message has been received from a vehicle control system (703). Determining (702), by the vehicle mounted wireless sensor device (501), whether an acknowledgement to the alarm message has been received from a vehicle control system (703) may be carried out by receiving a message response, such as for example, a Bluetooth Low Energy (BLE) scan response.

In addition, the method of FIG. 7 also includes in response to determining that the acknowledgement has been received, ceasing (704), by the vehicle mounted wireless sensor device (501), transmission of the alarm message. Ceasing (704), by the vehicle mounted wireless sensor device (501), transmission of the alarm message may be carried out by stopping and resetting the comparison to the configurable threshold for a particular duration; and stopping wirelessly transmitting the alarm message.

The method of FIG. 7 also includes in response to determining that the acknowledgement has not been received, continuing to persistently transmit (706), by the vehicle mounted wireless sensor device (501), the alarm message. Continuing to persistently transmit (706), by the vehicle mounted wireless sensor device (501), the alarm message in response to determining that the acknowledgement has not been received may be carried out by counting time from a last transmission of the alarm message; and when the amount of time from the last transmission of the alarm message exceeds a preconfigured threshold, transmitting the alarm message again.

For example, once the vehicle mounted wireless sensor device has determined that a monitored operational parameter has exceeded the configurable threshold, the vehicle mounted wireless sensor device may persistently transmit the alarm message until an acknowledgement is received from a particular system (e.g., a vehicle control system) or user device (e.g., a user's mobile device).

Figure 8A:
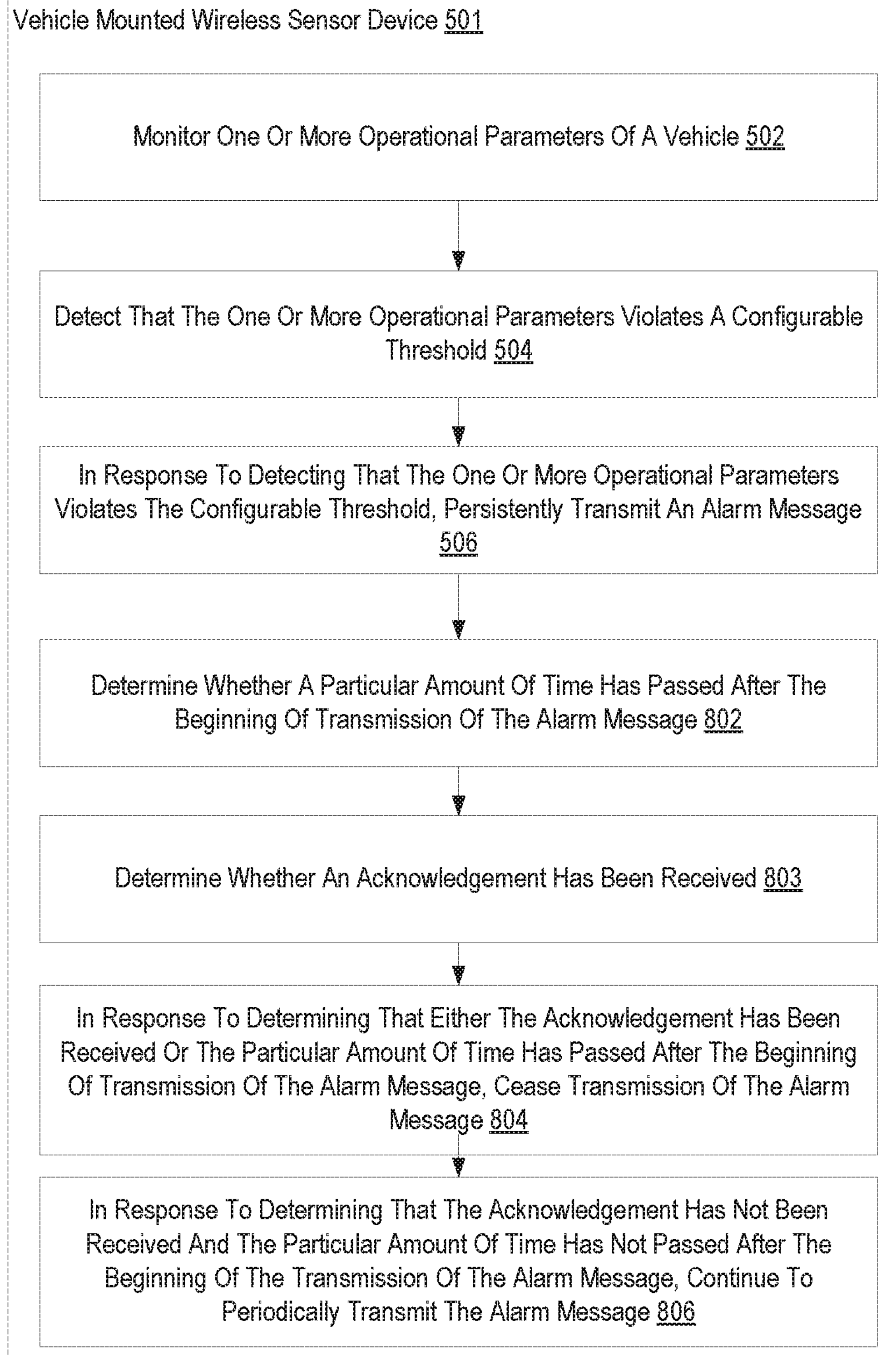
FIG. 8A sets forth a flowchart of another example method for persistent alarm transmissions associated with a vehicle mounted wireless sensor device in accordance with the present disclosure.

For further explanation, FIG. 8A sets forth a flow chart illustrating an exemplary method for persistent alarm transmissions associated with a vehicle mounted wireless sensor device according to embodiments of the present disclosure. Like the exemplary method of FIG. 5, the method of FIG. 8A also includes monitoring (502), by the vehicle mounted wireless sensor device (501), one or more operational parameters of a vehicle; detecting (504), by the vehicle mounted wireless sensor device (501), that the one or more operational parameters violates a configurable threshold; and in response to detecting that the one or more operational parameters violates the configurable threshold, persistently transmitting (506), by the vehicle mounted wireless sensor device (501), an alarm message.

The method of FIG. 8A differs from the method of FIG. 5 in that the method of FIG. 8A also includes determining (802), by the vehicle mounted wireless sensor device (501), whether a particular amount of time has passed after the beginning of transmission of the alarm message. Determining (802), by the vehicle mounted wireless sensor device (501), whether a particular amount of time has passed after the beginning of transmission of the alarm message may be carried out by tracking the amount of time that has passed since the beginning of transmission of the alarm message and comparing the amount to a predetermined threshold.

The method of FIG. 8A also includes determining (803), by the vehicle mounted wireless sensor device, whether an acknowledgement has been received in response to the transmission of the alarm message. Determining (803), by the vehicle mounted wireless sensor device, whether an acknowledgement has been received in response to the transmission of the alarm message may be carried out by receiving from another wireless device or VCS, a message response, such as for example, a Bluetooth Low Energy (BLE) scan response. In a particular embodiment, different alarm messages may have different devices which can provide an acceptable acknowledgement of the alarm message. The list of devices that may provide an acknowledgement for a particular alarm message may be configurable. For example, for a first alarm message, the only acknowledgements that are accepted may be from a VCS. As another example, for a second alarm message, acknowledgements from multiple device (e.g., a VCS, a mobile device, a configuration tool, etc.) on an approved configuration list may be recognized and accepted.

In addition, the method of FIG. 8A also includes in response to determining that either the acknowledgement has been received or the particular amount of time has passed after the beginning of transmission of the alarm message, ceasing (804), by the vehicle mounted wireless sensor device (501), transmission of the alarm message. Ceasing (804), by the vehicle mounted wireless sensor device (501), transmission of the alarm message in response to determining that either the acknowledgement has been received or the particular amount of time has passed after the beginning of transmission of the alarm message may be carried out by stopping and resetting the comparison to the configurable threshold for a particular duration; and stopping wirelessly transmitting the alarm message.

The method of FIG. 8A also includes in response to determining that both the acknowledgement has not been received and the particular amount of time has not passed after the beginning of transmission of the alarm message, continuing to persistently transmit (806), by the vehicle mounted wireless sensor device (501), the alarm message. Continuing to persistently transmit (806), by the vehicle mounted wireless sensor device (501), the alarm message in response to determining that both the acknowledgement has not been received and the particular amount of time has not passed after the beginning of transmission of the alarm message may be carried out by counting time from a last transmission of the alarm message; and when the amount of time from the last transmission of the alarm message exceeds a preconfigured threshold, transmitting the alarm message again.

For example, once the vehicle mounted wireless sensor device has determined that a monitored operational parameter has exceeded the configurable threshold, the vehicle mounted wireless sensor device may periodically transmit the alarm message until a set amount of time passes from the beginning of the transmission of the alarm message or an acknowledgement is received. In this example, the alarm transmission duration may be configurable and set by a user device or a vehicle control system. The duration may be selected by the vehicle mounted wireless sensor device to be dependent upon a severity of the violation of the configurable threshold. For example, if the measured tire pressure is lower than the configurable threshold by a particular amount, the duration that the vehicle mounted wireless sensor device transmits the alarm message may be increased.

For further explanation, FIG. 8B sets forth a flow chart illustrating an exemplary method for persistent alarm transmissions associated with a vehicle mounted wireless sensor device according to embodiments of the present disclosure. Like the exemplary method of FIG. 5, the method of FIG. 8B also includes monitoring (502), by the vehicle mounted wireless sensor device (501), one or more operational parameters of a vehicle; detecting (504), by the vehicle mounted wireless sensor device (501), that the one or more operational parameters violates a configurable threshold; and in response to detecting that the one or more operational parameters violates the configurable threshold, persistently transmitting (506), by the vehicle mounted wireless sensor device (501), an alarm message.

The method of FIG. 8B differs from the method of FIG. 5 in that the method of FIG. 8B also includes tracking (810), by the vehicle mounted wireless sensor device, a number of transmissions of the alarm message that are persistently transmitted in response to detecting that the one or more operational parameters violates the configurable threshold. Tracking (810), by the vehicle mounted wireless sensor device, a number of transmissions of the alarm message that are persistently transmitted in response to detecting that the one or more operational parameters violates the configurable threshold may be carried out by incrementing a counter in response to each transmission of an alarm message; and resetting the counter in response to ceasing persistent transmission of the alarm message.

The method of FIG. 8B includes determining (812), by the vehicle mounted wireless sensor device, whether the number of transmissions of the alarm message exceeds a predetermined threshold. Determining (812), by the vehicle mounted wireless sensor device, whether the number of transmissions of the alarm message exceeds a predetermined threshold may be carried out by comparing the number in a counter to the predetermined threshold.

The method of FIG. 8B also includes determining (813), by the vehicle mounted wireless sensor device, whether an acknowledgement has been received in response to the transmission of the alarm message. Determining (813), by the vehicle mounted wireless sensor device, whether an acknowledgement has been received in response to the transmission of the alarm message may be carried out by receiving a message response, such as for example, a Bluetooth Low Energy (BLE) scan response.

In addition, the method of FIG. 8B also includes in response to determining that either the acknowledgement has been received or the number of transmissions of the alarm message exceeds the predetermined threshold, ceasing (814), by the vehicle mounted wireless sensor device (501), transmission of the alarm message. Ceasing (814), by the vehicle mounted wireless sensor device (501), transmission of the alarm message in response to determining that either the acknowledgement has been received or the number of transmissions of the alarm message exceeds the predetermined threshold may be carried out by resetting a counter that tracks the number of transmissions of the alarm message persistently transmitted; and stopping wirelessly transmitting the alarm message.

The method of FIG. 8B also includes in response to determining that the both the acknowledgement has not been received and the number of transmissions of the alarm message does not exceed the predetermined threshold, continuing to persistently transmit (816), by the vehicle mounted wireless sensor device (501), the alarm message. Continuing to persistently transmit (816), by the vehicle mounted wireless sensor device (501), the alarm message in response to determining that both the acknowledgement has not been received and the number of transmissions of the alarm message does not exceed the predetermined threshold may be carried out by counting time from a last transmission of the alarm message; and when the amount of time from the last transmission of the alarm message exceeds a preconfigured threshold, transmitting the alarm message again.

For example, once the vehicle mounted wireless sensor device has determined that a monitored operational parameter has exceeded the configurable threshold, the vehicle mounted wireless sensor device may periodically transmit the alarm message until a set number of transmissions of the alarm message are transmitted or an acknowledgement is received. In this example, the number of transmissions may be configurable and set by a user device or a vehicle control system. The number or transmissions may be selected by the vehicle mounted wireless sensor device to be dependent upon a severity of the violation of the configurable threshold. For example, if the measured tire pressure is lower than the configurable threshold by a particular amount, the number of transmissions that the vehicle mounted wireless sensor device transmits may be increased.

Figure 9:
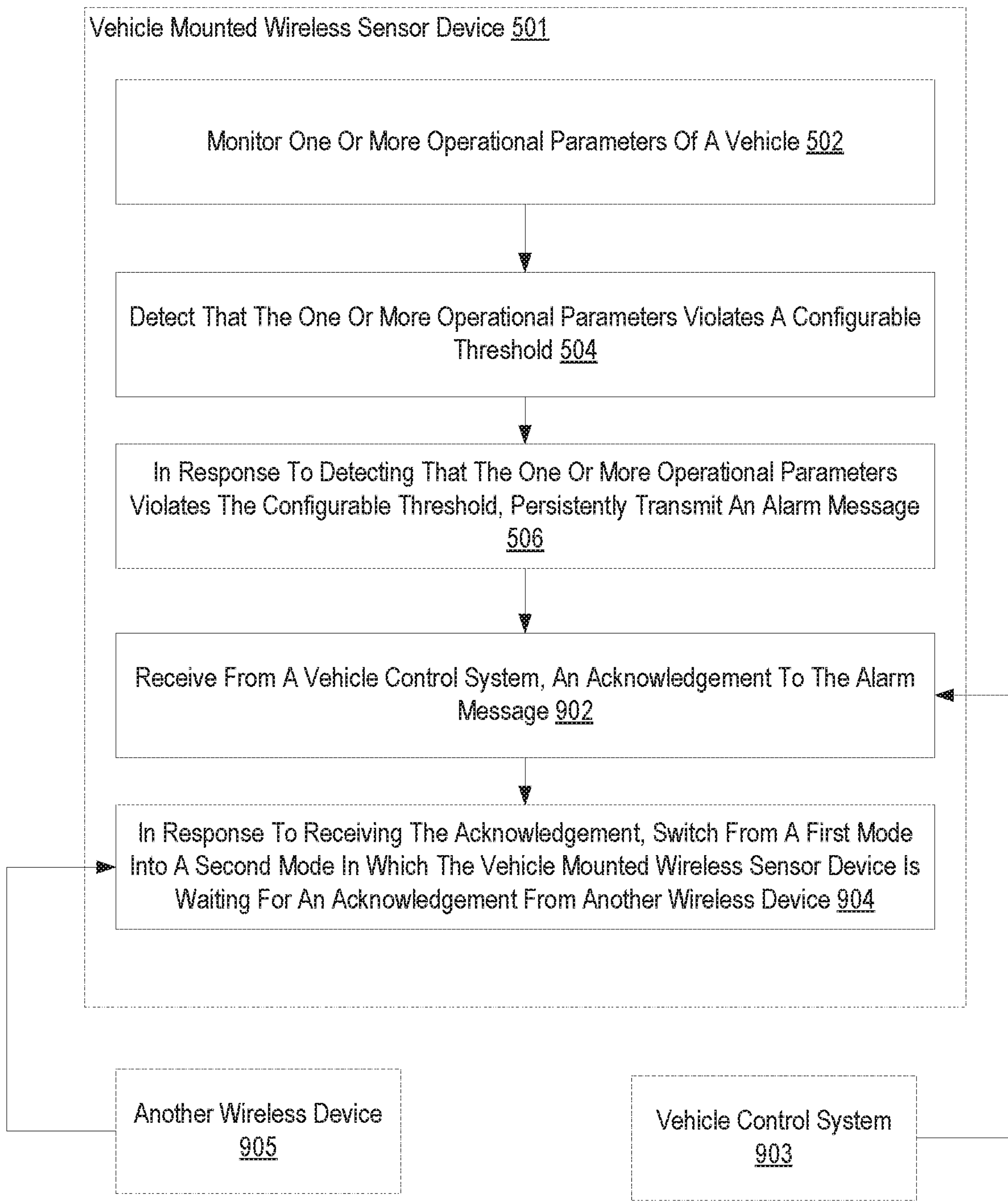
FIG. 9 sets forth a flowchart of another example method for persistent alarm transmissions associated with a vehicle mounted wireless sensor device in accordance with the present disclosure.

For further explanation, FIG. 9 sets forth a flow chart illustrating an exemplary method for persistent alarm transmissions associated with a vehicle mounted wireless sensor device according to embodiments of the present disclosure. Like the exemplary method of FIG. 5, the method of FIG. 9 also includes monitoring (502), by the vehicle mounted wireless sensor device (501), one or more operational parameters of a vehicle; detecting (504), by the vehicle mounted wireless sensor device (501), that the one or more operational parameters violates a configurable threshold; and in response to detecting that the one or more operational parameters violates the configurable threshold, persistently transmitting (506), by the vehicle mounted wireless sensor device (501), an alarm message.

The method of FIG. 9 differs from the method of FIG. 5 in that the method of FIG. 9 also includes receiving (902) from a vehicle control system (903), by the vehicle mounted wireless sensor device (501), an acknowledgement to the alarm message. Receiving (902) from a vehicle control system (903), by the vehicle mounted wireless sensor device (501), an acknowledgement to the alarm message may be carried out by receiving a Bluetooth Low Energy (BLE) scan response.

In addition, the method of FIG. 9 also includes in response to receiving the acknowledgement, switching (904), by the vehicle mounted wireless sensor device (501), from a first mode in which the vehicle mounted wireless sensor device (501) is waiting for an acknowledgement from the vehicle control system (903) into a second mode in which the vehicle mounted wireless sensor device (501) is waiting for an acknowledgment from another wireless device (905). Switching (904), by the vehicle mounted wireless sensor device (501), from a first mode in which the vehicle mounted wireless sensor device (501) is waiting for an acknowledgement from the vehicle control system (903) into a second mode in which the vehicle mounted wireless sensor device (501) is waiting for an acknowledgment from another wireless device (905) may be carried out by setting the vehicle control system to wait for one or more other wireless devices (e.g., a user mobile device) to send an acknowledgement that it has received the alarm message.

For example, in a particular embodiment, a user of the vehicle may want to be informed of any alarm message on a mobile device. In this example, the user may configure the vehicle mounted wireless sensor device's alarm transmission procedures to continue to transmit the alarm message until the user's mobile device has acknowledged the alarm message.

For further explanation, FIG. 10 sets forth a flow chart illustrating an exemplary method for persistent alarm transmissions associated with a vehicle mounted wireless sensor device according to embodiments of the present disclosure. Like the exemplary method of FIG. 5, the method of FIG. 10 also includes monitoring (502), by the vehicle mounted wireless sensor device (501), one or more operational parameters of a vehicle; detecting (504), by the vehicle mounted wireless sensor device (501), that the one or more operational parameters violates a configurable threshold; and in response to detecting that the one or more operational parameters violates the configurable threshold, persistently transmitting (506), by the vehicle mounted wireless sensor device (501), an alarm message.

The method of FIG. 10 differs from the method of FIG. 5 in that the method of FIG. 10 also includes in response to transmitting the alarm message, receiving (1002), by the vehicle mounted wireless sensor device (501), data regarding the alarm message. Receiving (1002), by the vehicle mounted wireless sensor device (501), data regarding the alarm message may be carried out by receiving configuration data from a wireless device or vehicle control system that indicates a priority of broadcasting an alarm message for violations of the configurable threshold. Priority may indicate a number of parameters associated with alarm transmission. Examples of priority may include but are not limited to an indication of which alarm message should be transmitted if multiple alarm messages are triggered for transmission; indication of which devices should be contacted; indication of what conditions are required for stopping transmission of the alarm message (e.g., duration, devices that must send an acknowledgement).

In addition, the method of FIG. 10 also includes based on the received data, determining (1004), by the vehicle mounted wireless sensor device (501), a priority for transmitting the alarm message. Determining (1004), based on the received data, by the vehicle mounted wireless sensor device (501), a priority for transmitting the alarm message may be carried out by configuring the alarm transmission procedures.

In the method of FIG. 10, persistently transmitting (506), by the vehicle mounted wireless sensor device (501), an alarm message in response to detecting that the one or more operational parameters violates the configurable threshold includes transmitting (1006), based on the determined priority, by the vehicle mounted wireless sensor device (501), the alarm message. Transmitting (1006), based on the determined priority, by the vehicle mounted wireless sensor device (501), the alarm message may be carried out by determining whether transmission of another alarm message has priority over the alarm message; and transmitting the alarm message for a specific duration or via a specific medium in accordance with the priority determination.

Figure 11:
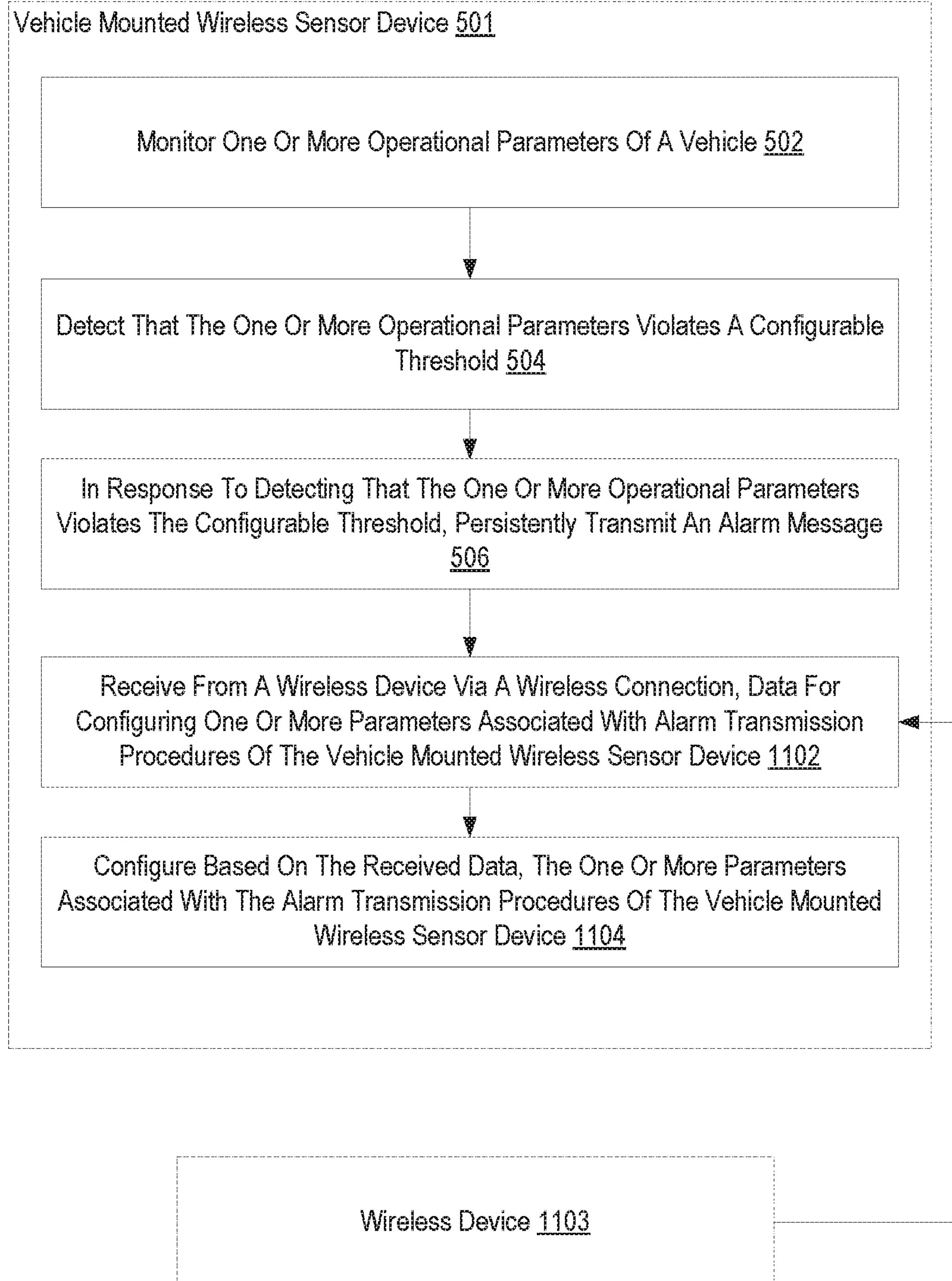
FIG. 11 sets forth a flowchart of another example method for persistent alarm transmissions associated with a vehicle mounted wireless sensor device in accordance with the present disclosure.

For further explanation, FIG. 11 sets forth a flow chart illustrating an exemplary method for persistent alarm transmissions associated with a vehicle mounted wireless sensor device according to embodiments of the present disclosure. Like the exemplary method of FIG. 5, the method of FIG. 11 also includes monitoring (502), by the vehicle mounted wireless sensor device (501), one or more operational parameters of a vehicle; detecting (504), by the vehicle mounted wireless sensor device (501), that the one or more operational parameters violates a configurable threshold; and in response to detecting that the one or more operational parameters violates the configurable threshold, persistently transmitting (506), by the vehicle mounted wireless sensor device (501), an alarm message.

The method of FIG. 11 differs from the method of FIG. 5 in that the method of FIG. 11 also includes receiving (1102) from a wireless device (1103) via a wireless connection, by the vehicle mounted wireless sensor device (501), data for configuring one or more parameters associated with alarm transmission procedures of the vehicle mounted wireless sensor device (501). Receiving (1102) from a wireless device (1103) via a wireless connection, by the vehicle mounted wireless sensor device (501), data for configuring one or more parameters associated with alarm transmission procedures of the vehicle mounted wireless sensor device (501) may be carried out by receiving data indicating a new configurable threshold and how the threshold is violated; receiving data indicating the procedures for ceasing transmission of an alarm message that is triggered in response to a violation of the new configurable threshold (e.g., duration of alarm transmission; which devices are required to acknowledge the alarm message before ceasing transmission).

In a particular embodiment, the data for configurating one or more parameters associated with alarm transmission procedures may include multiple thresholds for a particular alarm message. For example, a first threshold may correspond to a minor violation of an operational parameter and may result in one set of actions (e.g., persistently transmitting the low tire pressure alarm message for a first duration). As another example, a second threshold may correspond to a major violation of the same operational parameter and may result in a second set of actions (e.g., persistently transmitting the low tire pressure alarm message for a second duration).

In addition, the method of FIG. 11 also includes configuring (1104) based on the received data, by the vehicle mounted wireless sensor device (501), the one or more parameters associated with the alarm transmission procedures of the vehicle mounted wireless sensor device (501). Configuring (1104) based on the received data, by the vehicle mounted wireless sensor device (501), the one or more parameters associated with the alarm transmission procedures of the vehicle mounted wireless sensor device (501) may be carried out by setting or more parameters or flags within the memory of the vehicle mounted wireless sensor device.

Figure 12:
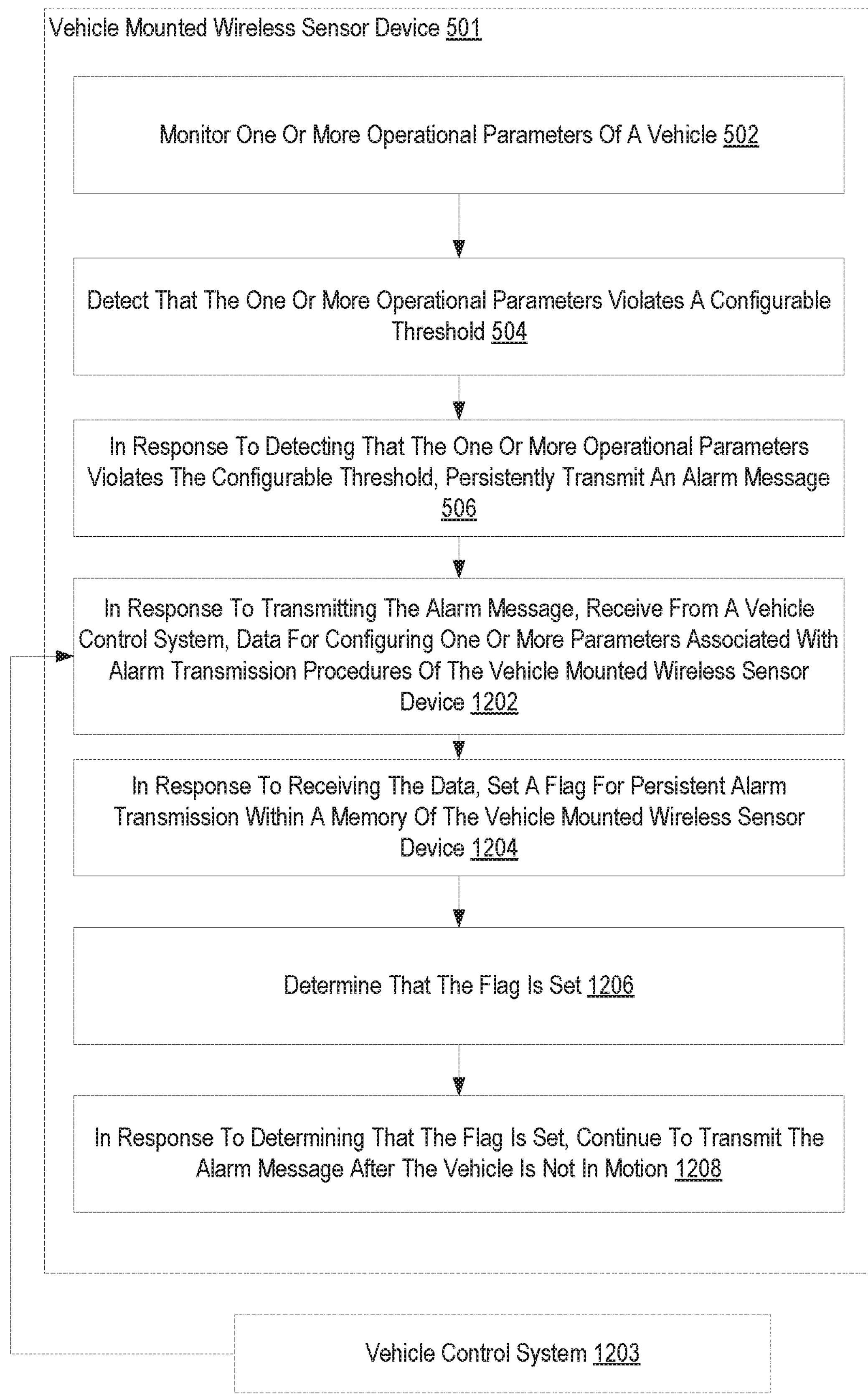
FIG. 12 sets forth a flowchart of another example method for persistent alarm transmissions associated with a vehicle mounted wireless sensor device in accordance with the present disclosure.

For further explanation, FIG. 12 sets forth a flow chart illustrating an exemplary method for persistent alarm transmissions associated with a vehicle mounted wireless sensor device according to embodiments of the present disclosure. Like the exemplary method of FIG. 5, the method of FIG. 12 also includes monitoring (502), by the vehicle mounted wireless sensor device (501), one or more operational parameters of a vehicle; detecting (504), by the vehicle mounted wireless sensor device (501), that the one or more operational parameters violates a configurable threshold; and in response to detecting that the one or more operational parameters violates the configurable threshold, persistently transmitting (506), by the vehicle mounted wireless sensor device (501), an alarm message.

The method of FIG. 12 differs from the method of FIG. 5 in that the method of FIG. 12 also includes in response to transmitting the alarm message, receiving (1202) from a vehicle control system (1203), by the vehicle mounted wireless sensor device (501), data for configuring one or more parameters associated with alarm transmission procedures of the vehicle mounted wireless sensor device (501). Receiving (1202) from a vehicle control system (1203), by the vehicle mounted wireless sensor device (501), data for configuring one or more parameters associated with alarm transmission procedures of the vehicle mounted wireless sensor device (501) may be carried out by receiving data indicating a new configurable threshold and how the threshold is violated; receiving data indicating the procedures for ceasing transmission of an alarm message that is triggered in response to a violation of the new configurable threshold (e.g., duration of alarm transmission; which devices are required to acknowledge the alarm message before ceasing transmission).

In addition, the method of FIG. 12 also includes in response to receiving the data, setting (1204), by the vehicle mounted wireless sensor device (501), a flag for persistent alarm transmission within a memory of the vehicle mounted wireless sensor device (501). Setting (1204), by the vehicle mounted wireless sensor device (501), a flag for persistent alarm transmission within a memory of the vehicle mounted wireless sensor device (501) may be carried out by configuring the vehicle mounted wireless sensor device to follow one or more procedures as indicated by the configurable data.

The method of FIG. 12 also includes determining (1206), by the vehicle mounted wireless sensor device (501), that the flag is set. Determining (1206), by the vehicle mounted wireless sensor device (501), that the flag is set may be carried out by examining one or more memory or register locations within the vehicle mounted wireless sensor device.

In addition, the method of FIG. 12 also includes in response to determining that the flag is set, continuing to transmit (1208), by the vehicle mounted wireless sensor device (501), the alarm message after the vehicle is not in motion. In response to determining that the flag is set, continuing to transmit (1208), by the vehicle mounted wireless sensor device (501), the alarm message after the vehicle is not in motion may be carried out by counting time from a last transmission of the alarm message; and when the amount of time from the last transmission of the alarm message exceeds a preconfigured threshold, transmitting the alarm message again.

Figure 13:
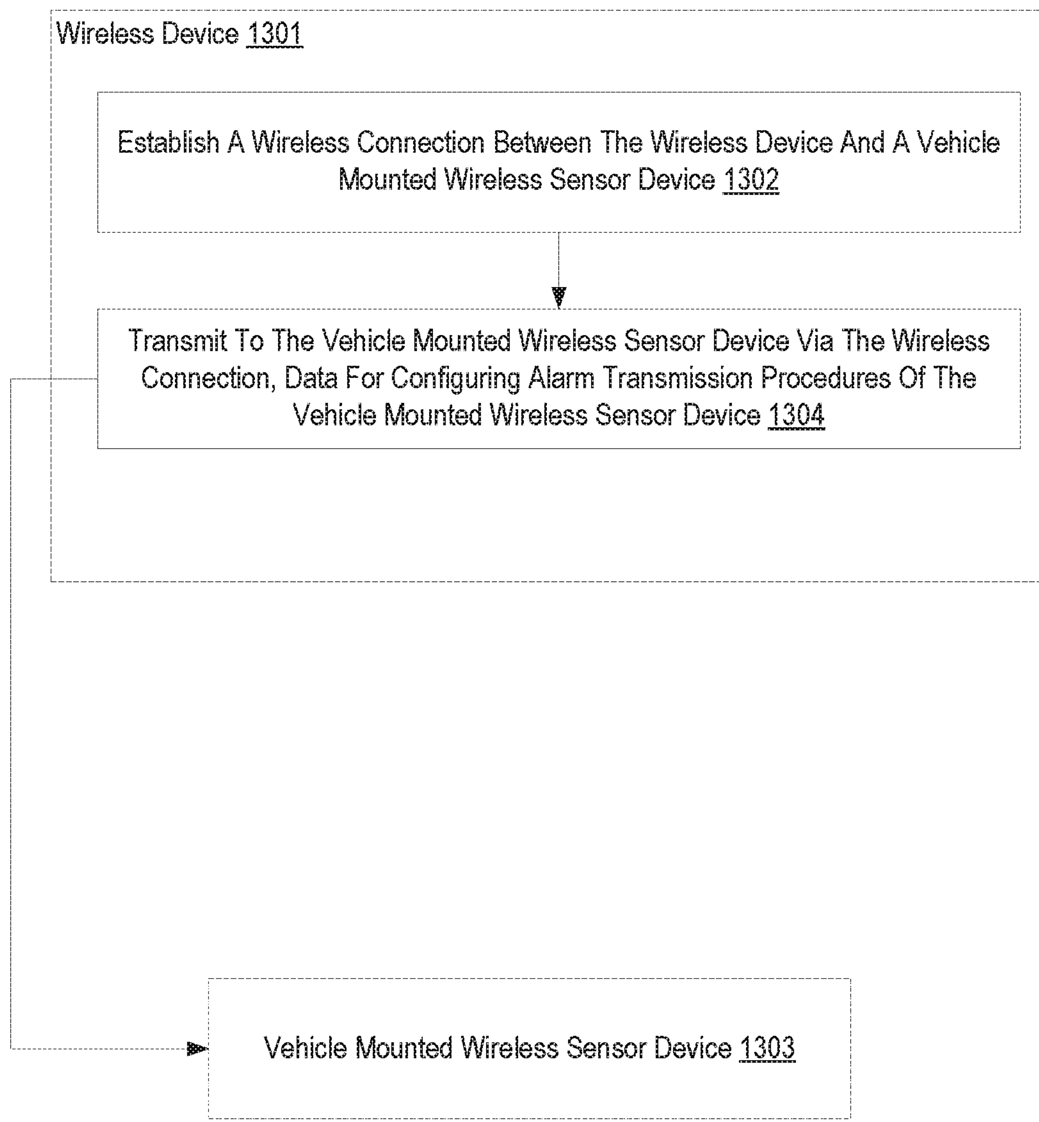
FIG. 13 sets forth a flowchart of another example method for persistent alarm transmissions associated with a vehicle mounted wireless sensor device in accordance with the present disclosure.

For further explanation, FIG. 13 sets forth a flow chart illustrating an exemplary method for persistent alarm transmissions associated with a vehicle mounted wireless sensor device according to embodiments of the present disclosure. The method of FIG. 13 includes establishing (1302), by a wireless device (1301), a wireless connection between the wireless device (1301) and a vehicle mounted wireless sensor device (1303). A wireless device may include any type of wireless device that is capable of wirelessly communicating configuration data to the vehicle mounted wireless sensor. Examples of wireless devices include but are not limited to handheld sensor configuration devices, sensor pairing devices, mobile devices, mobile phones, and vehicle controls systems (VCS). A vehicle mounted wireless sensor device may be any type of sensor device that is mounted within or on a vehicle and is capable of wirelessly transmitting and receiving. Examples of vehicle mounted wireless sensor device include but are not limited to tire pressure monitoring system (TPMS) sensor, wireless brake pad sensors, and wireless seat buckle sensors. Establishing (1302), by a wireless device (1301), a wireless connection between the wireless device (1301) and a vehicle mounted wireless sensor device (1303) may be carried out by pairing the wireless device with the vehicle mounted wireless sensor device including exchanging keys and passcodes; and sending other pairing data between the two devices.

The method of FIG. 13 also includes transmitting (1304) to the vehicle mounted wireless sensor device (1303) via the wireless connection, by the wireless device (1301), data for configuring alarm transmission procedures of the vehicle mounted wireless sensor device (1303). Transmitting (1304) to the vehicle mounted wireless sensor device (1303) via the wireless connection, by the wireless device (1301), data for configuring alarm transmission procedures of the vehicle mounted wireless sensor device (1303) may be carried out by sending configuration data that includes an indication of the new threshold and how the threshold is violated (e.g., by exceeding the threshold or by being below the threshold);

sending data indicating the procedures for ceasing transmission of an alarm message that is triggered in response to a violation of the new configurable threshold (e.g., duration of alarm transmission; which devices are required to acknowledge the alarm message before ceasing transmission).

In a particular embodiment, the configuration data specifies multiple thresholds for a particular alarm message. For example, a first threshold may correspond to a minor violation of an operational parameter and may result in one set of actions (e.g., persistently transmitting the low tire pressure alarm message for a first duration). As another example, a second threshold may correspond to a major violation of the same operational parameter and may result in a second set of actions (e.g., persistently transmitting the low tire pressure alarm message for a second duration).

Figure 14:
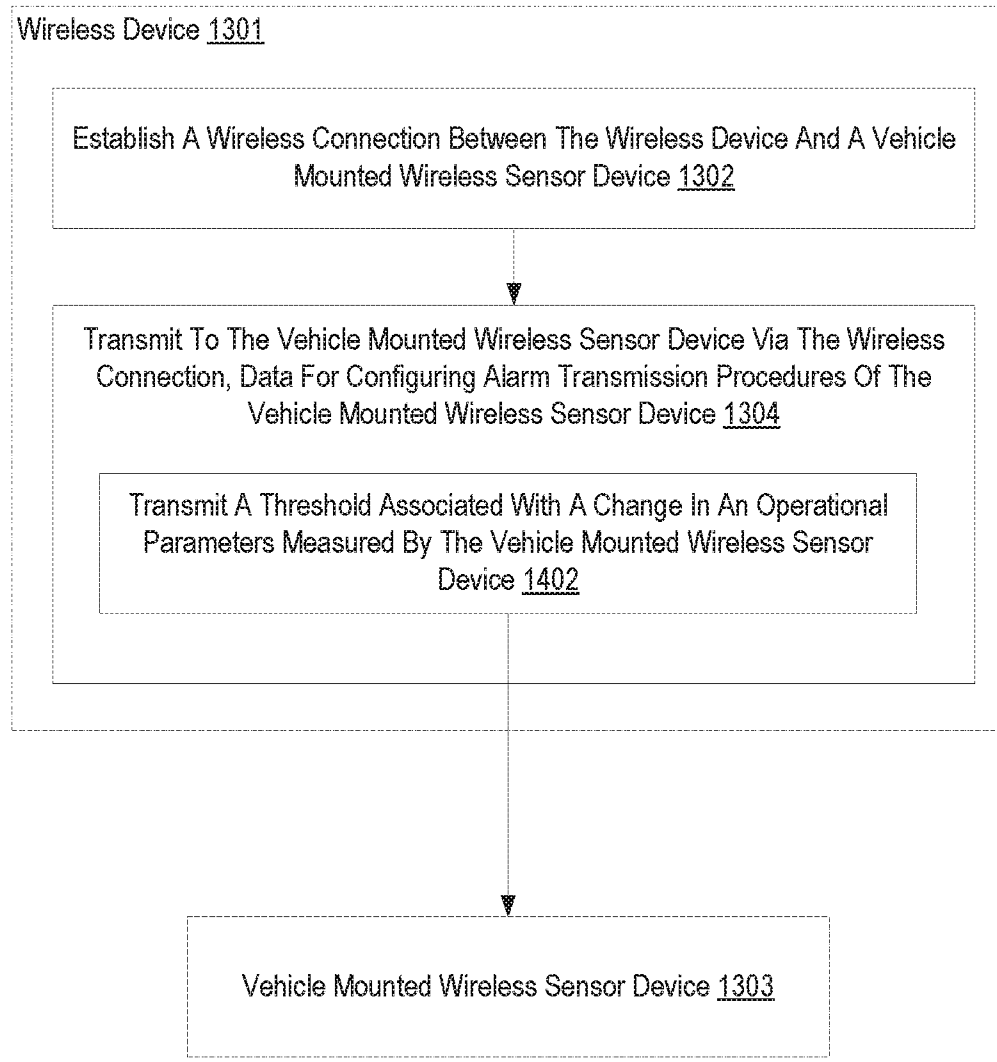
FIG. 14 sets forth a flowchart of another example method for persistent alarm transmissions associated with a vehicle mounted wireless sensor device in accordance with the present disclosure.

For further explanation, FIG. 14 sets forth a flow chart illustrating an exemplary method for persistent alarm transmissions associated with a vehicle mounted wireless sensor device according to embodiments of the present disclosure. Like the exemplary method of FIG. 13, the method of FIG. 14 also includes establishing (1302), by a wireless device (1301), a wireless connection between the wireless device (1301) and a vehicle mounted wireless sensor device (1303); and transmitting (1304) to the vehicle mounted wireless sensor device (1303) via the wireless connection, by the wireless device (1301), data for configuring alarm transmission procedures of the vehicle mounted wireless sensor device (1303).

In the method of FIG. 14, however, transmitting (1304) to the vehicle mounted wireless sensor device (1303) via the wireless connection, by the wireless device (1301), data for configuring alarm transmission procedures of the vehicle mounted wireless sensor device (1303) includes transmitting (1402) a threshold associated with a change in an operational parameter measured by the vehicle mounted wireless sensor device (1303). A configurable threshold is a threshold that can be changed, modified, or overwritten by another device. In a particular embodiment, the value of the configurable threshold may be selected to match a vehicle system's critical threshold of an operational parameter of a vehicle. For example, in a tire pressure monitoring system (TPMS), if the tire pressure of a tire goes below a particular critical threshold, the TPMS may alert a user via a dashboard icon of the tire's low tire pressure. As will be explained above, the vehicle mounted wireless sensor device may be configured to receive the configurable threshold from a vehicle system (e.g., a vehicle control system (VCS)) or a user via a wireless device (e.g., a mobile phone) and an indication of how to determine whether the threshold has been violated. For example, in a particular embodiment, a vehicle control system may be concerned with whether a first operational parameter from a first vehicle mounted wireless sensor device exceeds a first configurable threshold and whether a second operational parameter from a second vehicle mounted wireless sensor device is less than a second configurable threshold. Transmitting (1402) a threshold associated with a change in an operational parameter measured by the vehicle mounted wireless sensor device (1303) may be carried out by transmitting configuration data that includes an indication of the new threshold and how the threshold is violated (e.g., by exceeding the threshold or by being below the threshold).

Figure 15:
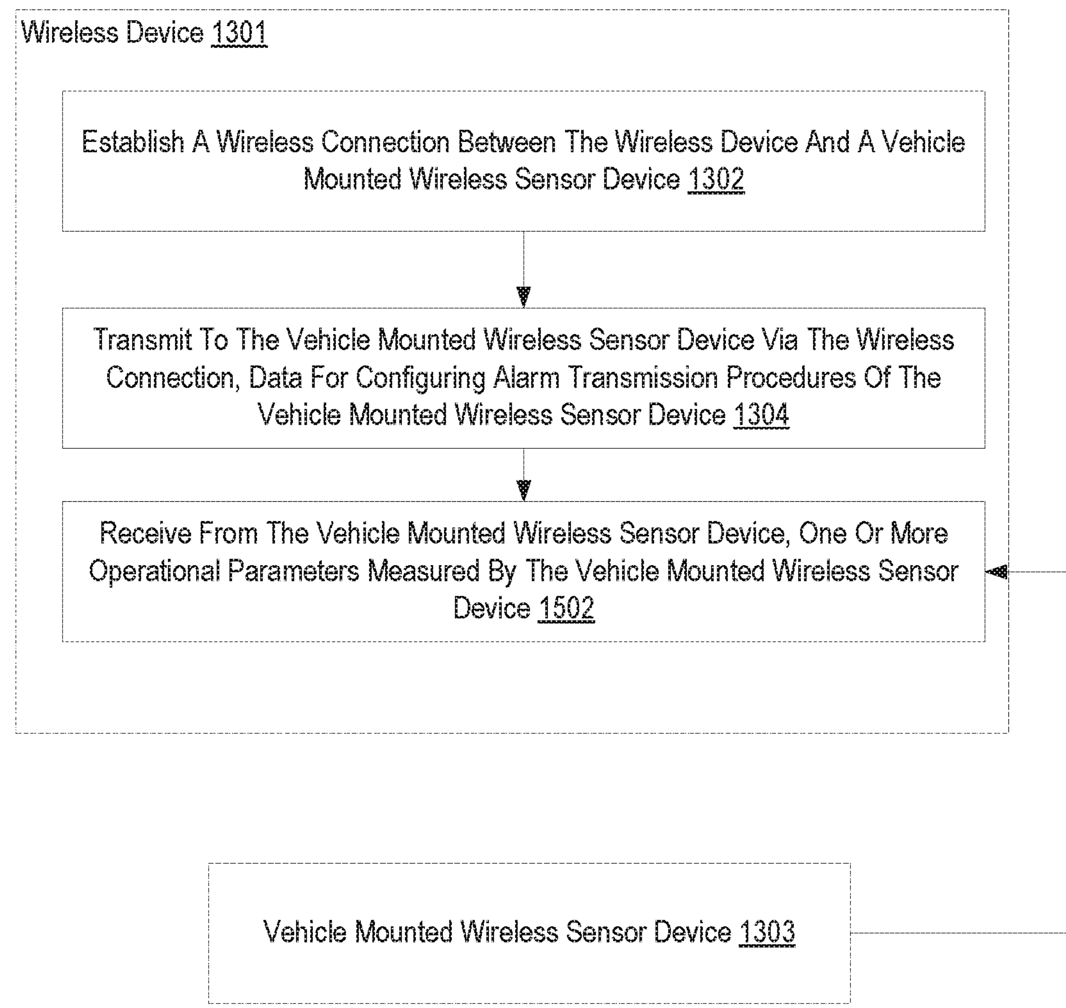
FIG. 15 sets forth a flowchart of another example method for persistent alarm transmissions associated with a vehicle mounted wireless sensor device in accordance with the present disclosure.

For further explanation, FIG. 15 sets forth a flow chart illustrating an exemplary method for persistent alarm transmissions associated with a vehicle mounted wireless sensor device according to embodiments of the present disclosure. Like the exemplary method of FIG. 13, the method of FIG. 15 also includes establishing (1302), by a wireless device (1301), a wireless connection between the wireless device (1301) and a vehicle mounted wireless sensor device (1303); and transmitting (1304) to the vehicle mounted wireless sensor device (1303) via the wireless connection, by the wireless device (1301), data for configuring alarm transmission procedures of the vehicle mounted wireless sensor device (1303).

The method of FIG. 15 differs from the method of FIG. 13 in that the method of FIG. 15 also includes receiving (1502) from the vehicle mounted wireless sensor device (1303), by the wireless device (1301), one or more operational parameters measured by the vehicle mounted wireless sensor device (1303). Examples of operational parameters of a vehicle include but are not limited to tire temperature and pressure; brake pad wear levels; fluid levels; and a binary indicator of whether a buckle is fastened or open. Receiving (1502) from the vehicle mounted wireless sensor device (1303), by the wireless device (1301), one or more operational parameters measured by the vehicle mounted wireless sensor device (1303) may be carried out by receiving data via a wireless connection.

Figure 16:
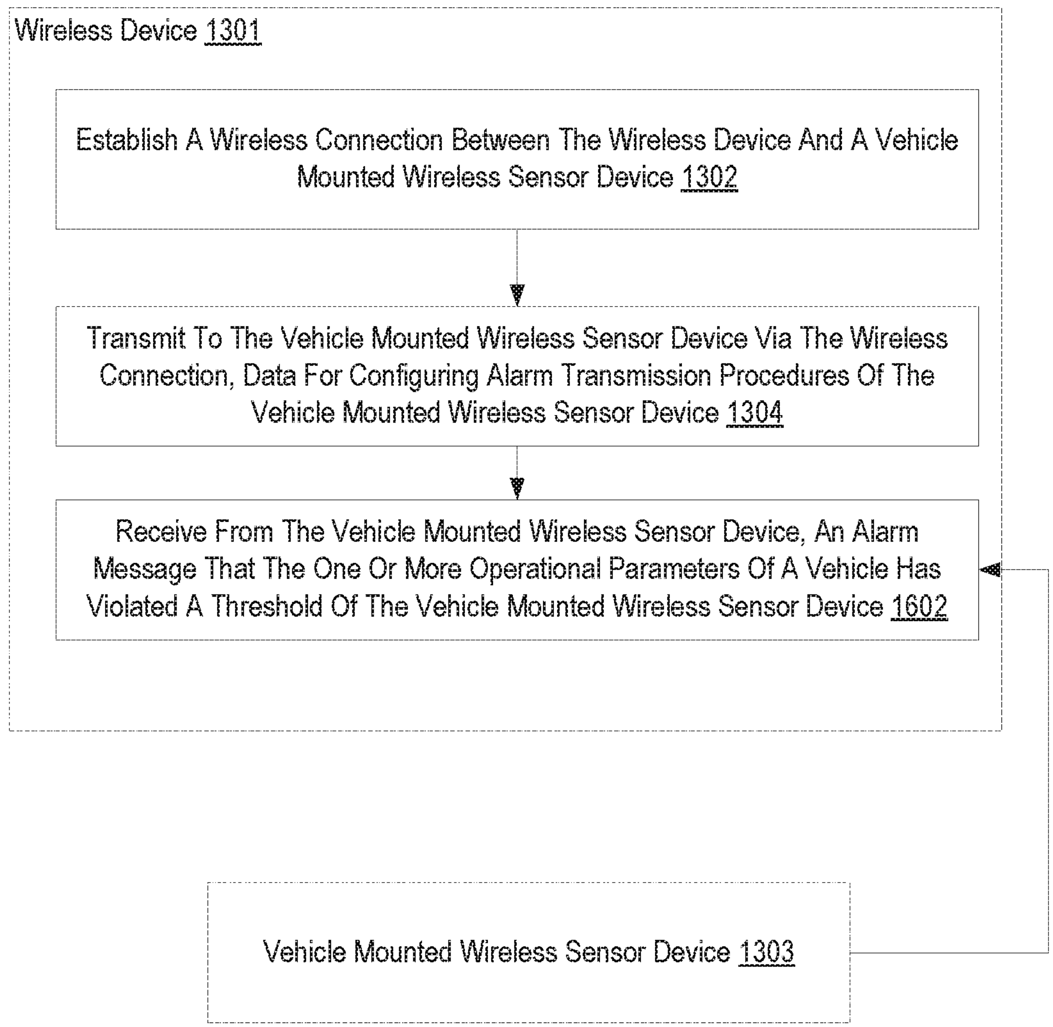
FIG. 16 sets forth a flowchart of another example method for persistent alarm transmissions associated with a vehicle mounted wireless sensor device in accordance with the present disclosure.

For further explanation, FIG. 16 sets forth a flow chart illustrating an exemplary method for persistent alarm transmissions associated with a vehicle mounted wireless sensor device according to embodiments of the present disclosure. Like the exemplary method of FIG. 13, the method of FIG. 16 also includes establishing (1302), by a wireless device (1301), a wireless connection between the wireless device (1301) and a vehicle mounted wireless sensor device (1303); and transmitting (1304) to the vehicle mounted wireless sensor device (1303) via the wireless connection, by the wireless device (1301), data for configuring alarm transmission procedures of the vehicle mounted wireless sensor device (1303).

The method of FIG. 16 differs from the method of FIG. 13 in that the method of FIG. 16 also includes receiving (1602) from the vehicle mounted wireless sensor device (1303), by the wireless device (1301), an alarm message that the one or more operational parameters of a vehicle has violated a threshold of the vehicle mounted wireless sensor device. Receiving (1602) from the vehicle mounted wireless sensor device (1303), by the wireless device (1301), an alarm message that the one or more operational parameters of a vehicle has violated a threshold of the vehicle mounted wireless sensor device may be carried out by receiving the alarm message via a wireless connection.

In view of the explanations set forth above, readers will recognize that the benefits of persistent alarm transmissions associated with a vehicle mounted wireless sensor device according to embodiments of the present disclosure include, but are not limited to:

- Reducing battery consumption as a result of reducing the frequency that alarm messages are transmitted by configuring the threshold for alarm transmission based on a vehicle system or user indication of an absolute critical threshold.
- Reducing battery consumption by minimizing the number of alarm message frames required to be transmitted by ceasing transmission of the alarm message in response to receiving an acknowledgement of the alarm message from another device.

Exemplary embodiments of the present invention are described largely in the context of a fully functional computer system for persistent alarm transmissions associated with a vehicle mounted wireless sensor device. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for persistent alarm transmissions associated with a vehicle mounted wireless sensor device, the method comprising:

monitoring, by a vehicle mounted wireless sensor device, one or more operational parameters of a vehicle;

detecting, by the vehicle mounted wireless sensor device, that the one or more operational parameters violates a configurable threshold that is configured by another device;

in response to detecting that the one or more operational parameters violates the configurable threshold, persistently transmitting, by the vehicle mounted wireless sensor device, an alarm message;

receiving from a vehicle control system, by the vehicle mounted wireless sensor device, an acknowledgement to the alarm message; and in response to receiving the acknowledgement, switching, by the vehicle mounted wireless sensor device, from a first mode in which the vehicle mounted wireless sensor device is waiting for an acknowledgement from the vehicle control system into a second mode in which the vehicle mounted wireless sensor device is waiting for an acknowledgment from another wireless device.

2. The method of claim 1 further comprising:

receiving from another wireless device, via a wireless connection, by the vehicle mounted wireless sensor device, a threshold; and in response to receiving the threshold, setting, by the vehicle mounted wireless sensor device, the received threshold as the configurable threshold.

3. The method of claim 1 further comprising:

determining, by the vehicle mounted wireless sensor device, whether an acknowledgement to the alarm message has been received from a vehicle control system;

in response to determining that the acknowledgement has been received, ceasing, by the vehicle mounted wireless sensor device, transmission of the alarm message; and in response to determining that the acknowledgement has not been received, continuing to persistently transmit, by the vehicle mounted wireless sensor device, the alarm message.

4. The method of claim 1 further comprising:

determining, by the vehicle mounted wireless sensor device, whether a particular amount of time has passed after the beginning of transmission of the alarm message; determining, by the vehicle mounted wireless sensor device, whether an acknowledgement has been received in response to the transmission of the alarm message;

in response to determining that either the acknowledgement has been received or the particular amount of time has passed after the beginning of transmission of the alarm message, ceasing, by the vehicle mounted wireless sensor device, transmission of the alarm message; and in response to determining that both the acknowledgement has not been received and particular amount of time has not passed after the beginning of transmission of the alarm message, continuing to persistently transmit, by the vehicle mounted wireless sensor device, the alarm message.

5. The method of claim 1 further comprising:

tracking, by the vehicle mounted wireless sensor device, a number of transmissions of the alarm message that are persistently transmitted in response to detecting that the one or more operational parameters violates the configurable threshold;

determining, by the vehicle mounted wireless sensor device, whether the number of transmissions of the alarm message exceeds a predetermined threshold; determining, by the vehicle mounted wireless sensor device, whether an acknowledgement has been received in response to the transmission of the alarm message;

in response to determining that either the acknowledgement has been received or the number of transmissions of the alarm message exceeds the predetermined threshold, ceasing, by the vehicle mounted wireless sensor device, transmission of the alarm message; and in response to determining that the both the acknowledgement has not been received and the number of transmissions of the alarm message does not exceed the predetermined threshold, continuing to persistently transmit, by the vehicle mounted wireless sensor device, the alarm message.

6. The method of claim 1 further comprising:

in response to transmitting the alarm message, receiving, by the vehicle mounted wireless sensor device, data regarding the alarm message; and based on the received data, determining, by the vehicle mounted wireless sensor device, a priority for transmitting the alarm message; and wherein in response to detecting that the one or more operational parameters violates the configurable threshold, persistently transmitting, by the vehicle mounted wireless sensor device, an alarm message includes transmitting, based on the determined priority, by the vehicle mounted wireless sensor device, the alarm message.

7. The method of claim 1 further comprising:

receiving from a wireless device via a wireless connection, by the vehicle mounted wireless sensor device, data for configuring one or more parameters associated with alarm transmission procedures of the vehicle mounted wireless sensor device; and configuring based on the received data, by the vehicle mounted wireless sensor device, the one or more parameters associated with the alarm transmission procedures of the vehicle mounted wireless sensor device.

8. The method of claim 1 further comprising:

in response to transmitting the alarm message, receiving from a vehicle control system, by the vehicle mounted wireless sensor device, data for configuring one or more parameters associated with alarm transmission procedures of the vehicle mounted wireless sensor device;

in response to receiving the data, setting, by the vehicle mounted wireless sensor device, a flag for persistent alarm transmission within a memory of the vehicle mounted wireless sensor device;

determining, by the vehicle mounted wireless sensor device, that the flag is set; and in response to determining that the flag is set, continuing to transmit, by the vehicle mounted wireless sensor device, the alarm message after the vehicle is not in motion.

9. A vehicle mounted wireless sensor device for persistent alarm transmissions associated with a vehicle mounted wireless sensor device, comprising:

a transceiver configured for bidirectional communication; and a controller configured to:

monitor one or more operational parameters of a vehicle;

detect that the one or more operational parameters violates a configurable threshold that is configured by another device;

in response to detecting that the one or more operational parameters violates the configurable threshold, persistently transmit an alarm message receive from a vehicle control system, an acknowledgement to the alarm message; and in response to receiving the acknowledgement, switch from a first mode in which the vehicle mounted wireless sensor device is waiting for an acknowledgement from the vehicle control system into a second mode in which the vehicle mounted wireless sensor device is waiting for an acknowledgment from another wireless device.

10. The vehicle mounted wireless sensor device of claim 9 wherein the controller is further configured to:

receive from another wireless device, via a wireless connection, a threshold; and in response to receiving the threshold, set the received threshold as the configurable threshold.

11. The vehicle mounted wireless sensor device of claim 9, wherein the controller is further configured to:

determine whether an acknowledgement to the alarm message has been received from a vehicle control system;

in response to determining that the acknowledgement has been received, cease transmission of the alarm message; and in response to determining that the acknowledgement has not been received, continue to persistently transmit the alarm message.

12. The vehicle mounted wireless sensor device of claim 9, wherein the controller is further configured to:

track, by the vehicle mounted wireless sensor device, a number of transmissions of the alarm message that are persistently transmitted in response to detecting that the one or more operational parameters violates the configurable threshold;

determine by the vehicle mounted wireless sensor device, whether the number of transmissions of the alarm message exceeds a predetermined threshold;

determine, by the vehicle mounted wireless sensor device, whether an acknowledgement has been received in response to the transmission of the alarm message;

in response to determining that either the acknowledgement has been received or the number of transmissions of the alarm message exceeds the predetermined threshold, cease, by the vehicle mounted wireless sensor device, transmission of the alarm message; and in response to determining that the both the acknowledgement has not been received and the number of transmissions of the alarm message does not exceed the predetermined threshold, continue to persistently transmit, by the vehicle mounted wireless sensor device, the alarm message.

13. A method for persistent alarm transmissions associated with a vehicle mounted wireless sensor device, the method comprising:

monitoring, by a vehicle mounted wireless sensor device, one or more operational parameters of a vehicle;

detecting, by the vehicle mounted wireless sensor device, that the one or more operational parameters violates a configurable threshold that is configured by another device;

in response to detecting that the one or more operational parameters violates the configurable threshold, persistently transmitting, by the vehicle mounted wireless sensor device, an alarm message;

in response to transmitting the alarm message, receiving, by the vehicle mounted wireless sensor device, data regarding the alarm message; and based on the received data, determining, by the vehicle mounted wireless sensor device, a priority for transmitting the alarm message;

wherein in response to detecting that the one or more operational parameters violates the configurable threshold, persistently transmitting, by the vehicle mounted wireless sensor device, an alarm message includes transmitting, based on the determined priority, by the vehicle mounted wireless sensor device, the alarm message.

14. The method of claim 13 further comprising:

receiving from another wireless device, via a wireless connection, by the vehicle mounted wireless sensor device, a threshold; and in response to receiving the threshold, setting, by the vehicle mounted wireless sensor device, the received threshold as the configurable threshold.

15. The method of claim 13 further comprising:

determining, by the vehicle mounted wireless sensor device, whether an acknowledgement to the alarm message has been received from a vehicle control system;

in response to determining that the acknowledgement has been received, ceasing, by the vehicle mounted wireless sensor device, transmission of the alarm message; and in response to determining that the acknowledgement has not been received, continuing to persistently transmit, by the vehicle mounted wireless sensor device, the alarm message.

16. The method of claim 13 further comprising:

determining, by the vehicle mounted wireless sensor device, whether a particular amount of time has passed after the beginning of transmission of the alarm message; determining, by the vehicle mounted wireless sensor device, whether an acknowledgement has been received in response to the transmission of the alarm message;

in response to determining that either the acknowledgement has been received or the particular amount of time has passed after the beginning of transmission of the alarm message, ceasing, by the vehicle mounted wireless sensor device, transmission of the alarm message; and in response to determining that both the acknowledgement has not been received and particular amount of time has not passed after the beginning of transmission of the alarm message, continuing to persistently transmit, by the vehicle mounted wireless sensor device, the alarm message.

17. The method of claim 13 further comprising:

tracking, by the vehicle mounted wireless sensor device, a number of transmissions of the alarm message that are persistently transmitted in response to detecting that the one or more operational parameters violates the configurable threshold;

determining, by the vehicle mounted wireless sensor device, whether the number of transmissions of the alarm message exceeds a predetermined threshold; determining, by the vehicle mounted wireless sensor device, whether an acknowledgement has been received in response to the transmission of the alarm message;

in response to determining that either the acknowledgement has been received or the number of transmissions of the alarm message exceeds the predetermined threshold, ceasing, by the vehicle mounted wireless sensor device, transmission of the alarm message; and in response to determining that the both the acknowledgement has not been received and the number of transmissions of the alarm message does not exceed the predetermined threshold, continuing to persistently transmit, by the vehicle mounted wireless sensor device, the alarm message.

18. The method of claim 13 further comprising:

receiving from a vehicle control system, by the vehicle mounted wireless sensor device, an acknowledgement to the alarm message; and in response to receiving the acknowledgement, switching, by the vehicle mounted wireless sensor device, from a first mode in which the vehicle mounted wireless sensor device is waiting for an acknowledgement from the vehicle control system into a second mode in which the vehicle mounted wireless sensor device is waiting for an acknowledgment from another wireless device.

19. The method of claim 13 further comprising:

receiving from a wireless device via a wireless connection, by the vehicle mounted wireless sensor device, data for configuring one or more parameters associated with alarm transmission procedures of the vehicle mounted wireless sensor device; and configuring based on the received data, by the vehicle mounted wireless sensor device, the one or more parameters associated with the alarm transmission procedures of the vehicle mounted wireless sensor device.

20. The method of claim 13 further comprising:

in response to transmitting the alarm message, receiving from a vehicle control system, by the vehicle mounted wireless sensor device, data for configuring one or more parameters associated with alarm transmission procedures of the vehicle mounted wireless sensor device;

in response to receiving the data, setting, by the vehicle mounted wireless sensor device, a flag for persistent alarm transmission within a memory of the vehicle mounted wireless sensor device;

determining, by the vehicle mounted wireless sensor device, that the flag is set; and in response to determining that the flag is set, continuing to transmit, by the vehicle mounted wireless sensor device, the alarm message after the vehicle is not in motion.

* * * * *